United States Patent [19]
Chigira

[11] Patent Number: 5,163,356
[45] Date of Patent: Nov. 17, 1992

[54] AUTOMATIC FOOD VENDING MACHINE

[75] Inventor: Noboru Chigira, Saitama, Japan

[73] Assignee: Sanyo Electric Co., Ltd., Osaka, Japan

[21] Appl. No.: 692,151

[22] Filed: Apr. 26, 1991

[30] Foreign Application Priority Data

Apr. 27, 1990 [JP] Japan .................................. 2-113132

[51] Int. Cl.⁵ ........................ A47J 27/00; A47J 31/00; A47J 37/00; G07F 11/00
[52] U.S. Cl. ........................................ 99/282; 99/286; 99/288; 99/289 R; 99/290; 99/326; 99/357; 99/484; 221/150 A; 221/150 HC; 364/479
[58] Field of Search .................. 99/357, 342, 443 R, 99/443 C, 325, 326, 334, 484, 335, 357, 280–282, 286, 288, 289 R, 290; 221/150 R, 150 A, 150 HC; 364/479, 478

[56] References Cited

U.S. PATENT DOCUMENTS

| | | | |
|---|---|---|---|
| 3,291,035 | 12/1966 | Ignelzi | 99/357 |
| 3,340,790 | 9/1967 | Simjian | 99/357 |
| 3,384,497 | 5/1968 | Gassman | 99/334 |
| 3,442,200 | 5/1969 | Babel | 99/357 |
| 3,866,795 | 2/1975 | Urano | 221/150 HC |
| 4,171,066 | 10/1979 | Hirose | 221/150 A |
| 4,671,425 | 6/1987 | Knoll | 221/150 HC |
| 4,722,267 | 2/1988 | Galockin et al. | 99/443 R |
| 4,748,902 | 6/1988 | Maurantonio | 99/443 C |
| 4,784,292 | 11/1988 | Johndrow et al. | 99/357 |
| 4,813,572 | 3/1989 | Schmidt | 221/150 HC |

FOREIGN PATENT DOCUMENTS

| | | | |
|---|---|---|---|
| 2055178 | 5/1972 | Fed. Rep. of Germany | 221/150 HC |
| 2443200 | 3/1976 | Fed. Rep. of Germany | 221/150 HC |
| 1359015 | 3/1964 | France | 99/357 |
| 63-19919 | 4/1988 | Japan . | |
| 63-27259 | 7/1988 | Japan . | |
| 63-36460 | 9/1988 | Japan . | |
| 1237899 | 9/1989 | Japan . | |

Primary Examiner—Timothy F. Simone
Attorney, Agent, or Firm—Darby & Darby

[57] ABSTRACT

An automatic food vending machine comprises: a cooking means for cooking food materials; a first storage means for preserving food materials for a long period; a second storage means for preserving food materials in a condition that they can be instantly cooked by said cooking means; a first transport means for transporting food materials from said first storage means to said second storage means; and a second transport means for transporting food materials from said second storage means to said cooking means. A large quantity of food materials may be stored in the first storage means and transported to the second storage means by the first transport means as required. In the second storage means the food materials are stored so that they may be instantly cooked. The apparatus permits on one hand preservation of a large amount of food materials without deterioration and on the other hand prepare them for quick heat treatment for sale.

6 Claims, 24 Drawing Sheets

FIG. 3

| (CALENDAR) | | | HOURLY SALES RECORD (TIME) | | | | | | | | | | | |
| --- | --- | --- | --- | --- | --- | --- | --- | --- | --- | --- | --- | --- | --- | --- |
| SECTION | DATE | DAY | 0 | 2 | 4 | 6 | 8 | 10 | 12 | 14 | 16 | 18 | 20 | 22 | 24 |
| WEEKDAY | 7 | WED. | 0 | 0 | 0 | 0 | 2 | 0 | 0 | 12 | 0 | 1 | 15 | 10 | 0 |
| WEEKDAY | 8 | THU. | 0 | 0 | 0 | 0 | 1 | 0 | 0 | 18 | 0 | 1 | 12 | 12 | 0 |
| WEEKDAY | 9 | FRI. | 0 | 0 | 0 | 0 | 1 | 0 | 0 | 15 | 0 | 2 | 15 | 15 | 0 |

FIG. 4

| (CALENDAR) | | | HOURLY SALES RECORD (TIME) | | | | | | | | | | |
|---|---|---|---|---|---|---|---|---|---|---|---|---|---|
| SECTION | DATE | DAY | 0  2 | 2  4 | 4  6 | 6  8 | 8  10 | 10  12 | 12  14 | 14  16 | 16  18 | 18  20 | 20  22 | 22  24 |
| WEEKDAY | 10 | SAT. | 0 | 0 | 0 | 2 | 0 | 0 | 16 | 0 | 3 | 15 | 10 | 0 |
| HOLIDAY | 11 | SUN. | 0 | 0 | 0 | 0 | 0 | 1 | 1 | 0 | 0 | 0 | 0 | 0 |

FIG. 10

| (CALENDAR) | | | HOURLY SALES RECORD (TIME) | | | | | | | | | | | | |
|---|---|---|---|---|---|---|---|---|---|---|---|---|---|---|---|
| SECTION | DATA | DAY | 0 | 2 | 4 | 6 | 8 | 10 | 12 | 14 | 16 | 18 | 20 | 22 | 24 |
| WEEKDAY | 7 | WED. | 0 | 0 | 0 | 15 | 10 | 8 | 9 | 20 | 11 | 8 | 1 | | 0 |
| WEEKDAY | 8 | THU. | 0 | 0 | 0 | 20 | 12 | 6 | 10 | 18 | 13 | 10 | 3 | | 0 |
| WEEKDAY | 9 | FRI. | 0 | 0 | 0 | 18 | 10 | 9 | 8 | 22 | 11 | 8 | 2 | | 0 |

FIG. 11

| (CALENDAR) | | | HOURLY SALES RECORD (TIME) | | | | | | | | | | | |
|---|---|---|---|---|---|---|---|---|---|---|---|---|---|---|
| SECTION | DATE | DAY | 0 2 | 4 | 6 | 8 | 10 | 12 | 14 | 16 | 18 | 20 | 22 | 24 |
| WEEKDAY | 10 | SAT. | 0 | 0 | 0 | 19 | 11 | 9 | 10 | 21 | 13 | 10 | 3 | 0 |
| HOLIDAY | 11 | SUN. | 0 | 0 | 0 | 0 | 2 | 1 | 1 | 2 | 0 | 0 | 0 | 0 |

AUTOMATIC FOOD VENDING MACHINE

FIELD OF THE INVENTION

The invention relates to a vending machine which may automatically carry out simple cooking such as heating and/or blending of a multiplicity of food materials for sale.

BACKGROUND OF THE INVENTION

As is well known it is necessary in vending food by an automatic vending machine to preserve frozen foods such as meat-buns and to heat them for sale.

However, since frozen foods take some time before they are completely cooked, it is difficult to prepare the necessary amount of food from frozen food in a short period of time, which hinders meeting the needs of both customers and vendors who desire to sale food in meal hours. This causes a big problem particularly in factories and offices.

Use of refrigerators instead of freezers relieves this problem somewhat in that refrigerated foods may be cooked in short time without being thawed. However, it is apparent that refrigerators cannot preserve foods in good condition for a long period as compared to freezers, thereby requiring frequent replenishment and tedious maintenance of food materials.

Japanese Patent Early Publication No. 1-237899 discloses a vending machine which stores a certain amount of already cooked food for sale based on a sale prediction. This machine may provides food quickly on demand. However, it cannot avoid deterioration of certain foods before sale.

A similar problem is encountered in a coffee vending machine which stores coffee materials and extracts coffee from the materials on an order made by a customer. In order to serve tasty coffee in such a coffee vending machine it is desirable to preserve coffee beans, instead of ground coffee materials. However, ground coffee has been only infrequently used in vending machine since grinding coffee beans and dripping coffee time is too involved and is consuming.

Coffee vending machines using ground coffee have an additional problem in that only a small amount of ground coffee may be stored in a vending machine, since ground coffee may be easily deteriorated, and hence it is difficult to preserve ground coffee fresh for a long time. Therefore, such coffee vending machines require frequent attendance for replenishment of fresh ground coffee.

It should be noted in the case of coffee vending machines, that coffee materials, no matter whether they are ground or not, oxidize very easily when they are exposed to the oxygen in the air, and humidity promotes deteioration. In order to prevent this undesirable change, coffee materials are usually preserved in evacuated containers or containers filled with nitrogen. However, it is not easy to maintain a vacuum or keep nitrogen in such a container under frequent use of the coffee. Consequently, these coffee vending machines are usually very complex in structure and are not suitable for vending a large amount of coffee.

BRIEF DESCRIPTION OF THE INVENTION

The invention is directed to solve these problems as mentioned above. Therefore, a primary object of the invention is to provide a vending machine that may preserve a large stock of food materials and at the same time may cook them in a short time.

Another object of the invention is to provide means for preserving food materials hermetically in a comparatively simple manner, thereby keeping the food materials in desirable conditions for a long period.

In one mode of the invention an automatic food vending machine comprises:
- a cooking means for cooking food materials;
- a first storage means for preserving food materials for a long period;
- a second storage means for preserving food materials in a condition ready for instant cooking by said cooking means;
- a first transport means for transporting food materials from said first storage means to said second storage means;
- a second transport means for transporting food materials from said second storage means to said cooking means.

In this arrangement of an automatic food vending machine, a large amount of food materials may be preserved in the first storage means for a very long time. A necessary amount of the food material is transported by the first transport means from the first storage means to the second storage means, where the food materials are stored in conditions suitable for complete and instant cooking. Thus, the machine may meet the requirements that on one hand it must store food materials in conditions suitable for a long term preservation and on the other hand it must maintain food materials ready for instant cooking.

A preferred embodiment provides an automatic food vending machine with:
- a memory means for storing information concerning the foods that were sold over a predetermined period;
- a computing means for computing a necessary amount of food to be stored in the second storage means based on the information stored in the memory means; and
- a control means for controlling the operation of the first transport means based on the computation by the computing means.

With these means the automatic food vending machine may control the first transport means for providing the second storage means with necessary amount of food materials based on the needs of said food materials. Consequently, only necessary and yet sufficient amount of food materials are kept ready for cooking.

In another embodiment of the invention an automatic food vending machine comprises:
- a cooking means for cooking food materials;
- a first storage means for hermetically preserving food materials;
- a second storage means for non-hermetically preserving food materials;
- a first transport means for transporting food materials from said first storage means to said second storage means;
- a second transport means for transporting food materials from said second storage means to said cooking means.

In this arrangement of the automatic food vending machine food materials may be preserved in said first storage means hermetically and only a necessary amount of food material is furnished into said second storage means by the first transport means, where the food materials are stored non-hermetically. Individual vending operations do not affect the hermetic condition of the first storage means, since food materials may be supplied from the second storage means for cooking.

The invention also provides an automatic food vending machine with:
- a memory means for storing information concerning the foods that were sold over a predetermined period;
- a computing means for computing desirable storage conditions based on the information stored in the memory means; and
- a control means for controlling the operation of the first transport means based on the computed storage conditions.

In this arrangement a certain amount of food materials calculated from the information stored in the memory is transported from the first preservation means to the second storage means so that only a necessary and sufficient amount of food materials may be stored in stand-by sale conditions.

In another mode of the invention an automatic food vending machine is provided with: a cooking means for cooking food materials; a first storage means for hermetically preserving food materials; a second storage means for non-hermetically preserving food materials; a first transport means for transporting food materials from said first storage means to said second preservation means; and a second transport means for transporting food materials from said second storage means to said cooking means.

It is desirable to preserve powdered food materials packed in hermetic packs in the first storage means and to provide the automatic food vending machine with a cutting mean, disposed between the first storage means and the second storage means, for cutting packs delivered there from the first storage means by the first transport means, so that unpacked food materials may be stored in the second storage means.

Use of such packed food materials allows preservation of food materials in different packing conditions, thereby enhancing freedom of preservation in the automatic food vending machine.

It is desirable to further provide the automatic food vending machine with a vibration means for vibrating, in the case of a powdered food material, the unpacked food materials, so that the food material may be completely taken out of the pack.

BRIEF DESCRIPTION OF THE DRAWINGS

FIG. 1–FIG. 5 inclusive illustrate a first automatic food vending machine embodying the invention, in which:

FIG. 1 shows the concept of the invention;

FIG. 2 is a block diagram of a control circuit for use with the automatic food vending machine;

FIG. 3 and FIG. 4 show the contents stored in the memory; and

FIG. 5 is a flow chart showing the control operation in the automatic food vending machine.

FIG. 6–FIG. 11 inclusive illustrate a second automatic food vending machine embodying the invention, in which:

FIG. 6 is perspective view of the main portion of the apparatus;

FIG. 7 and FIG. 8 are cross sections of the main portion of the machine;

FIG. 9 is a block diagram of a control circuit for use with the automatic food vending machine;

FIG. 10 and FIG. 11 show the contents stored in the memory; and

FIG. 13–FIG. 25 inclusive illustrate a fourth automatic food vending machine embodying the invention, in which:

FIG. 13 is a perspective view of the main body of the machine;

FIG. 14 is a side view of the machine.

FIG. 15 is a front view of the machine.

FIG. 16–FIG. 19 inclusive show how to introduce food materials into a tank of the machine.

FIG. 20 shows the functional relationship between the pack storing means and the unpacking means of the machine.

FIG. 21 shows the construction of a push means.

FIG. 22 shows the construction of the unpacking means.

FIG. 23 shows the mechanisms of a pressurizing cylinder and a push cylinder of the machine.

FIG. 24 is a block diagram of the electric circuit for use with the invention.

FIG. 25 is a flow chart showing the operation of the machine.

DETAILED DESCRIPTION OF THE PREFERRED EMBODIMENT

Referring now to FIGS. 1 through 5, there is shown a first automatic food vending machine embodying the invention for storing frozen foods such as meat-buns and for vending the foods by heat-treating them. The machine is simply referred to as automatic vending machine.

Figure 1:
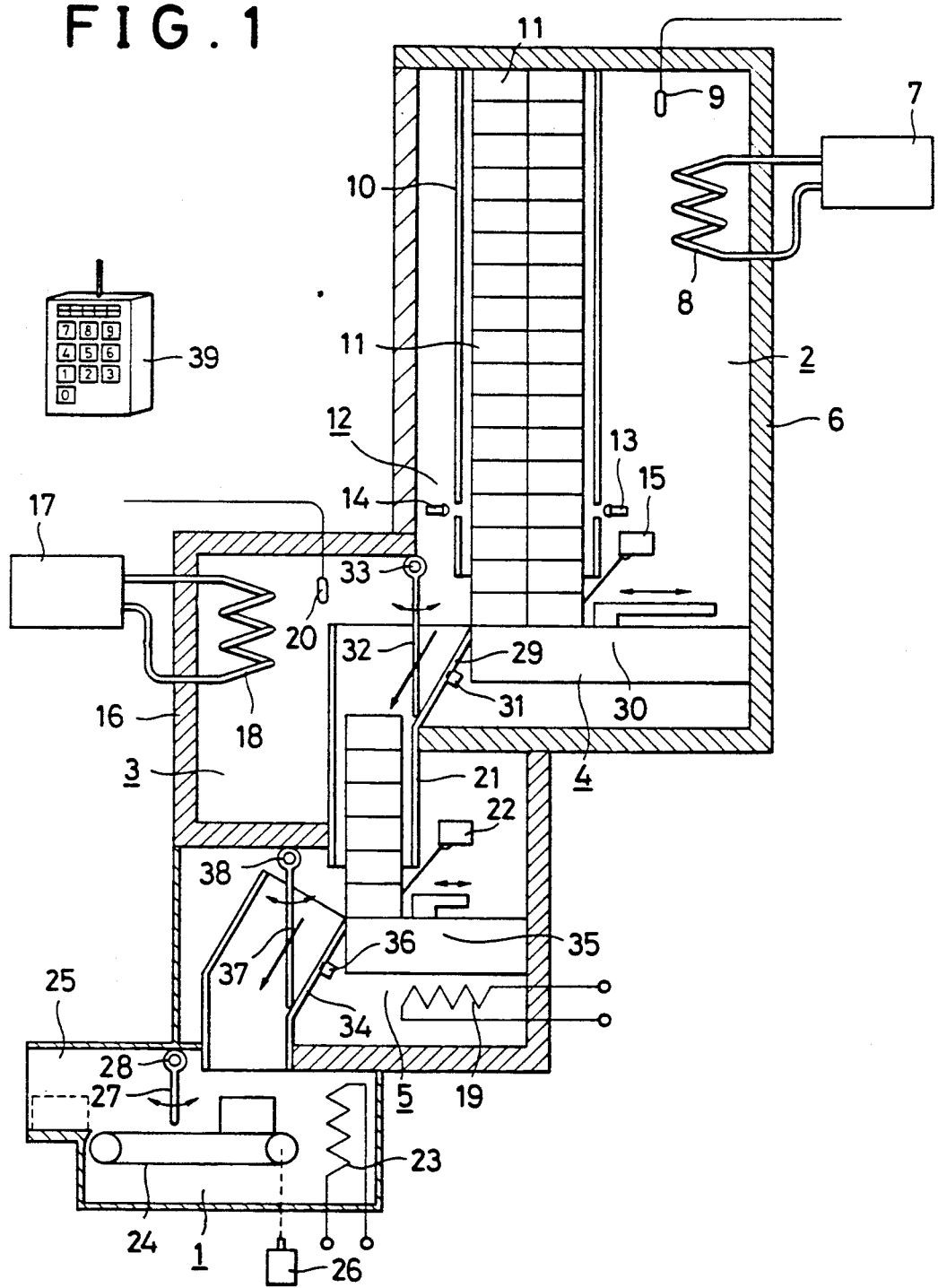

As shown in FIG. 1, the automatic vending machine includes as its major elements: a heating apparatus 1 as a means for heat-treating food material; a freezer 2 as a first storage means for storing food material for a long period; a refrigerator 3 as a second storage means for storing food material so that they can be instantly cooked by the heating apparatus 1; a first transport means 4 for transporting the food material from the freezer 2 to the refrigerator 3; and a second transport means 5 for transporting food material from the second storage means to the heating apparatus 1.

Detailed structures of the components of the automatic vending machine are now described with reference to FIG. 1. The freezer 2 has a wall 6 of thermal insulation material, a refrigeration unit 7, a heat exchanger 8, a temperature sensor 9 for controlling the refrigeration unit 7, a set of stock shelves (which will be hereinafter referred to as stocker) 10 for storing food material 11 in stack, a detector 12 comprising an illumination element 13 and a light receiving element 14 for detecting the remaining amount of stock food material in the stocker 10 less than a predetermined level, and a merchandise detector 15 for detecting whether or not last stock of food material or a merchandise is present in the stocker 10. In this arrangement the freezer 2 may store a large amount of food material 11 at about $-18°$ C. for long term preservation.

The refrigerator 3 has a thermal insulation wall 16, a refrigeration unit 17, a heat exchanger 18, a heater 19, a temperature sensor 20 for controlling the refrigeration unit 17 and the heater 19, a stocker 21 for storing food material 11 in stack, and a merchandise detector for detecting whether or not the last stock of food material or merchandise is present in the stocker 21. In this arrangement the refrigerator 3 may, in comparison with the freezer 2, contain a lesser amount of food material 11 at a comparatively high temperature.

The heating apparatus 1 has a cooking heater 23, a conveyer 24 for supporting food material 11 thereon during cooking by the cooking heater 23 and for conveying the cooked food to a discharge outlet 25, a motor 26 for driving the conveyer 24, and a shutter 27 that may be closed/opened which is rotatably mounted on a shaft 28 at an intermediate position of the food material transport route of the conveyer 24, for preventing heated air from escaping from the heating apparatus 1. The conveyer 24 and a motor 26 also serve to deliver cooked food to the discharge outlet 25 to a customer.

The first transport means 4 has a chute 29 connecting the bottom of the stocker 10 of the freezer 2 with the stocker 21 of the refrigerator 3, an extraction apparatus 30 for extracting food material 11 in the stocker 10 to the chute 29, a merchandise counter 31 comprising an electrostatic sensor mounted on the chute 29, and a shutter 32 rotatably mounted on a shaft 33 in the neighborhood of the chute 29 for preventing the cold air from escaping from the freezer 2.

The second transport means 5 has a chute 34 connecting the bottom of the stocker 21 of the refrigerator 3 with the conveyer 24 of the heating apparatus 1, an extraction apparatus 35 for extracting food material 11 from the stocker 21 to the conveyer 24 through the chute 34, a merchandise counter 36 comprising an electrostatic capacitor sensor mounted on the chute 34, and a shutter 37 rotatably mounted on a shaft 38 in the neighborhood of the chute 34 for preventing the cold air from escaping from the refrigerator 3.

A replenishment data switch 39 is provided for a maintenance operator to input the number of food packs to be replenished in the stocker 10.

Figure 2:
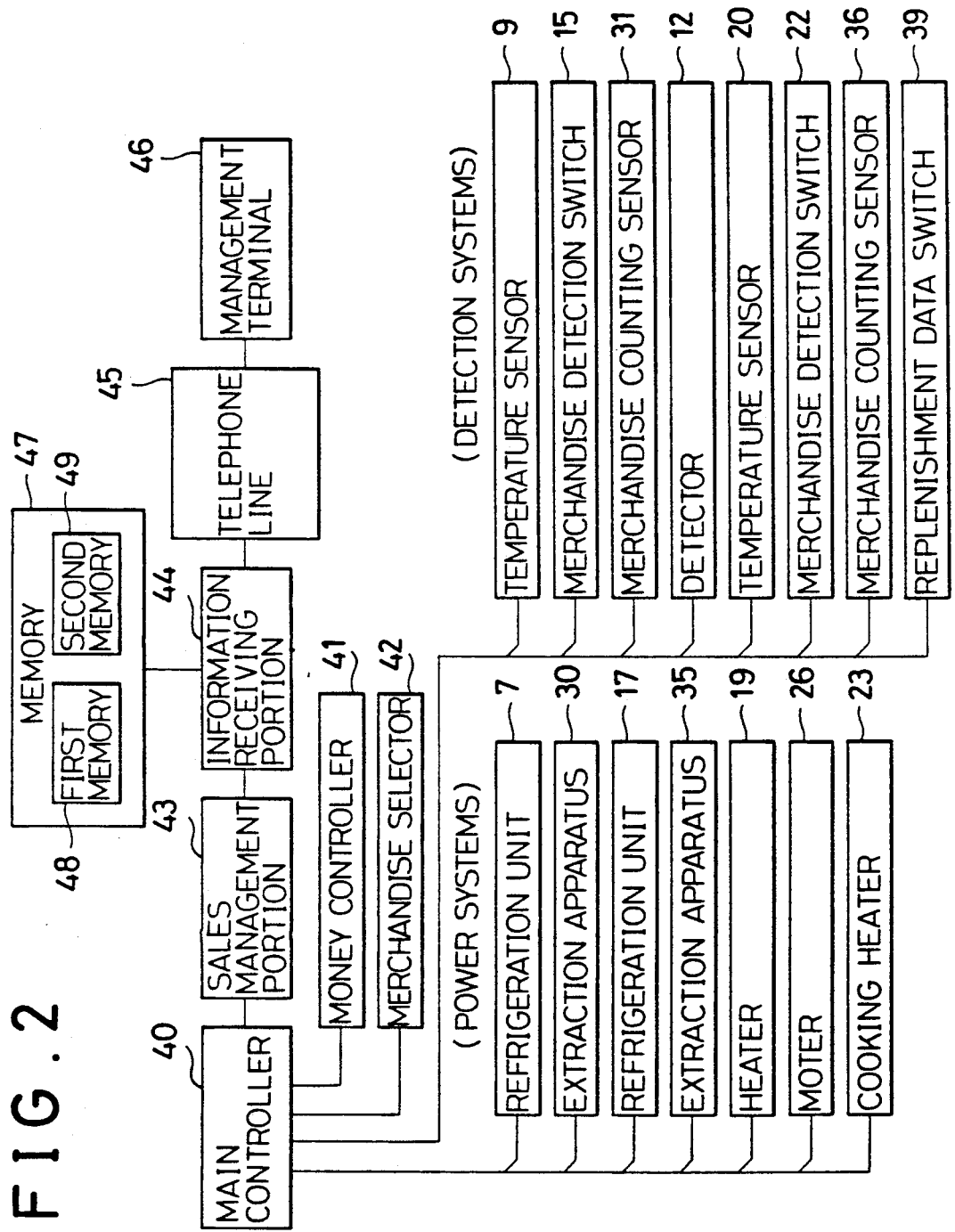

Referring to FIG. 2 a control system for the automatic vending machine is now described.

A main controller 40, which may be a microcomputer, collects information from the temperature sensors 9 and 20 merchandise detection switches 15 and 22, and controls the operations of the driving means such as refrigeration units 7 and 17, and the extraction apparatuses 30 and 35. The main controller 40 corresponds to the main control system of the automatic vending machine. A money controller 41 deals with coins deposited by customers and prepaid cards as well as change to be paid back. A merchandise selector 42 includes switches for customers to select desired merchandise.

A sale management portion 43 connected with the main controller 40 is also connected with a management terminal 46 for use by a manager through an information receiving portion 44 and a telephone line 45. The sale management portion 43 may be also a microcomputer as the main controller 40, and includes a prediction means for predicting the need (or the amount of foods that would be sold) in the near future based on the information stored in a memory, as described below in detail, and a computing means for computing from the prediction made the maintenance conditions desirable for the need i.e. the amounts of food material 11 to be stored in the freezer 2 and in the refrigerator 3, and the preheating temperature of the heating apparatus 1.

A memory 47, connected with the sale management portion 43, includes a first memory 48 for memorizing such information as the calendar information as shown in FIG. 3 (which is a record of working days and holidays of an office where an automatic vending machine is set up), and a corresponding vending record or the daily amounts of foods cooked and sold there, and a second memory 49 for memorizing predicted amounts of foods that the sale management portion computed from the record stored in the first memory 48, as shown in FIG. 4.

Figure 5:
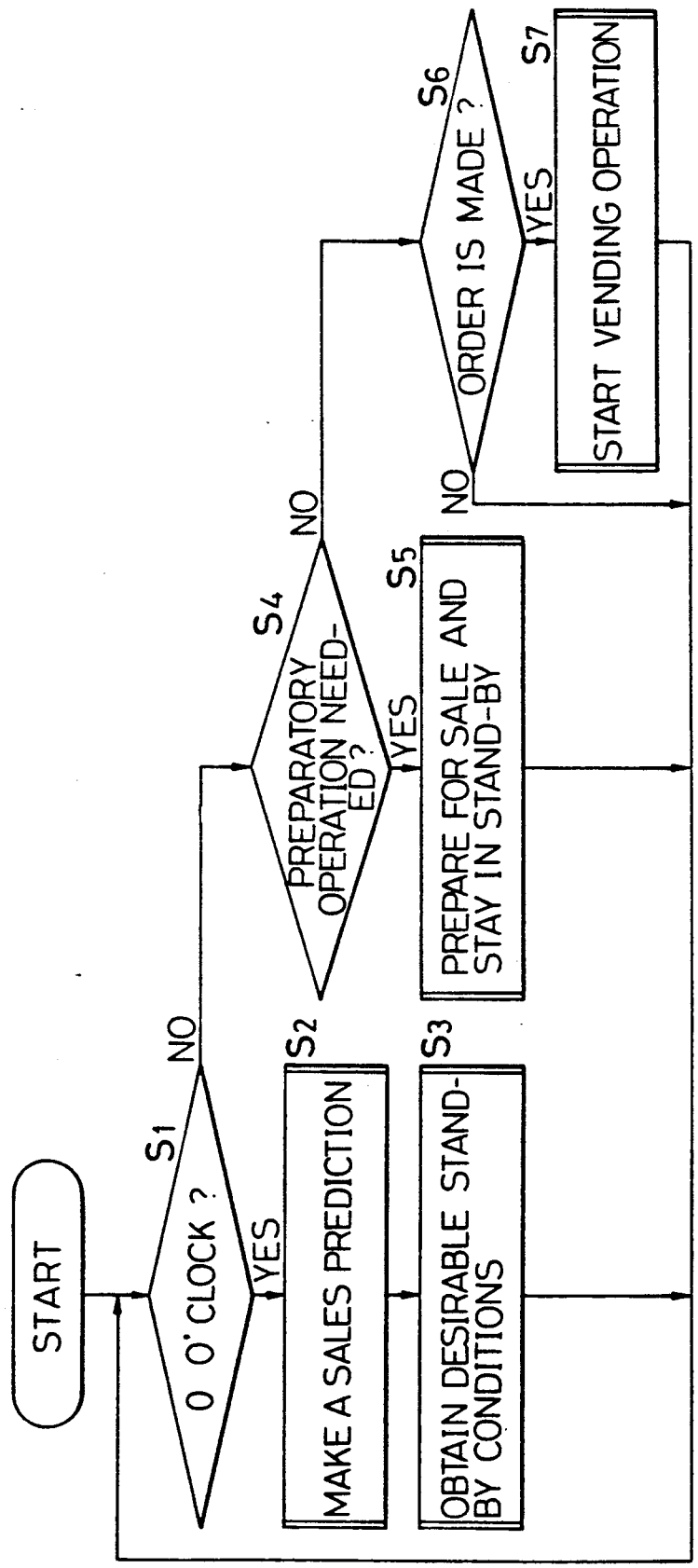

The operation of the automatic vending machine is now described with reference to FIG. 5 which shows a flow of procedures taken by the sale management portion 43 of the automatic vending machine. The figure shows that the present time is February 10, 0 o'clock, just after finishing vending operation for February 9 and the vending machine is about to start the operation for February 10. The sale management portion 43 is informed by an internal clock (not shown) that the time is 0 o'clock (step S1) and makes a prediction for future sale based on the calendar information and the record of sale stored in the first memory 48 as shown in FIG. 3, to obtain a result as shown in FIG. 4, which result is stored in the second memory 49 (step S2). This step S2 corresponds to the prediction means. The sale management portion 43 then computes the best stand-by conditions in terms of the amount of food material 11 to be stored in respective freezer 2, refrigerator 3 for particular future times along with the required preheating temperatures by the heating apparatus 1, so that cooking may be minimized when required (step S3). This step S3 corresponds to the computing means.

The sale management portion 43 starts a particular preparatory and stand-by operations as scheduled (steps 4 and 5), so that food material may be prepared in desirable conditions and cooked quickly for customers. As the money controller 41 informs the main controller 40 of the balance, the main controller 40 instructs those means including extraction apparatus 35, cooking heater 23, and the motor 26 to start vending operation (steps S6 and S7).

The operation further proceeds as follows. At February 10, 0 o'clock, there are 34 packs of remaining food material 11 in the freezer 2, and only 1 in the refrigerator 3. The sale management portion 43 now makes a prediction operation for the subsequent two days and obtains a result as shown in FIG. 4. According to this result, predicted amount of the packs to be sold during February 10 amounts to 46 packs in total, so that it is desirable to store at least 46 packs of food material 11 in the automatic vending machine. In actuality, however, the remaining amount is short by 11 packs. Therefore, a replenishment operation is required, so that the sale management portion 43 informs, through the information receiving portion 44 and the telephone line 45, the management terminal 46 of the shortage and urges replenishment of 11 packs of food material.

However, since no sale is predicted until 6 o'clock, the automatic vending machine stays in a stand-by condition, with the freezer 2 and the refrigerator 3 remaining in normal operating conditions.

Since two packs would be sold during the period from 6 to 8 o'clock, the desirable preparation operation at 5 o'clock is to put two packs of food material 11 in the refrigerator 3 and begin thawing. Therefore, at 5 o'clock the sale management portion 43 informs the main controller 40 that there should be two packs of the food material 11 in the refrigerator 3. Upon receiving a signal indicative of the information, the main controller 40 instructs the extraction apparatus 30 to send two packs of food material 11 into the refrigerator 3 and at the same time starts operation of the heater 19 until the temperature inside the refrigerator 3 reaches 8°-9° C. The food material 11 in the packs will be thawed in about one hour as it stays in the atmosphere of 8°-9° C. The main controller 40 will then stops operation of the heater 19 at 6 o'clock and restore the normal refrigeration temperature of 1°-2° C. in the refrigerator 3.

At 5:50 the sale management portion 43 will inform the main controller 40 that the heating means 1 is to be preheated, since according to the prediction, customers will soon come for the food. The main controller 40 then turns on the cooking heater 23 and preheat the heating apparatus 1 and maintains it in the range of 60°-70° C. This helps shorten cooking time.

If at 7:05 a customer deposits coins in the money controller 41 and operates the merchandise selector 42, the main controller 40 operates the extraction apparatus 35 to send the already thawed food material 11 into the heating apparatus 1, and then turns on the cooking heater 23 to cook the food material. Since the food material 11 has been thawed and kept at a fairly high temperature, it may be quickly heated in about 1 minute to a temperature in the range of 70°-80° C., which is a favorable temperature for served food. Upon completion of cooking, the main controller 40 operates the conveyer 24 to deliver the cooked food to the discharge outlet 25, where the customer may receive it.

A machine manager receives the shortage information on the management terminal 46 installed in his office and connected with the sale management portion 43 through the information receiving portion 44 and the telephone line 45. The manager will go to the automatic vending machine at around 9 o'clock when no sale is predicted, and replenish the necessary amount of food material 11 in the freezer 2, and input replenishment data into the replenishment data switch 39, which data is given to the main controller 40 and the sale management portion 43. The sale management portion 43 then clears the food shortage signals directed to the management terminal 46.

With such arrangement as described above, a great amount of food material 11 may be stored in favorable conditions in the automatic vending machine due to the facts that the freezer 2 may store the food material 11 in conditions suitable for long term preservation and that the refrigerator 3 may store foods at higher temperature than the freezer 2 so that food may be cooked quickly. Replenishment of a great deal of food material may be made, so that management of food material is also simplified.

Further, by controlling the amount of food material furnished from the freezer 2 to the refrigerator 3 based on the stored information on the need of the food material, adequate amount of food material 11 may be stored in favorable conditions.

It is noted that instead of the heater 19 and the cooking heater 23, a high frequency magnetron for generating high frequency radiation may be used in directly and efficiently heating food material 11 containing water as a component.

Referring now to FIGS. 6 through 11, there is shown a second mode of the invention, embodied in the form of an automatic coffee vending apparatus. In this case a food material (which will be referred to as material) is coffee beans and the coffee vending apparatus provides coffee extracted from ground coffee.

Figure 6:
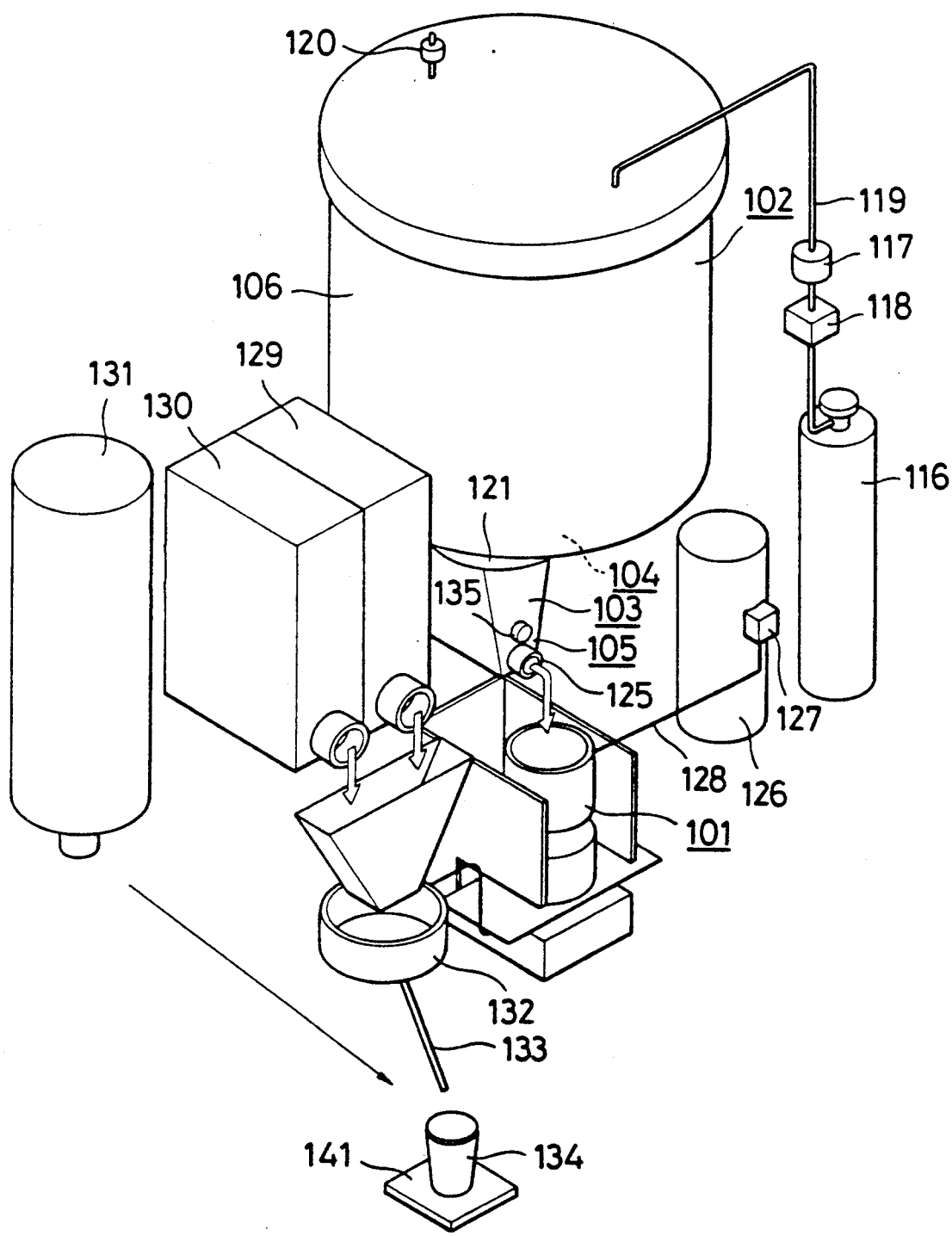

The automatic vending apparatus in this example includes as cooking apparatus a coffee extraction apparatus 101 for extracting coffee from ground coffee, as shown in FIG. 6, a first material supply apparatus 102 serving as the first storage means for storing the coffee beans in a sealed container filled with carbon dioxide gas (for long term preservation), a first material supply apparatus 102 serving as a first storage means, a second material supply apparatus 103 serving as a second storage means for non-hermetically storing ground coffee so that the coffee extraction apparatus 101 may extract coffee in a short time, a first transport means 104 for transporting material from the first material storage means 102 to the second material supply apparatus 103, and a second transport means 105 for transporting material from the second material supply apparatus 103 to the coffee extraction apparatus 101.

Figure 7:
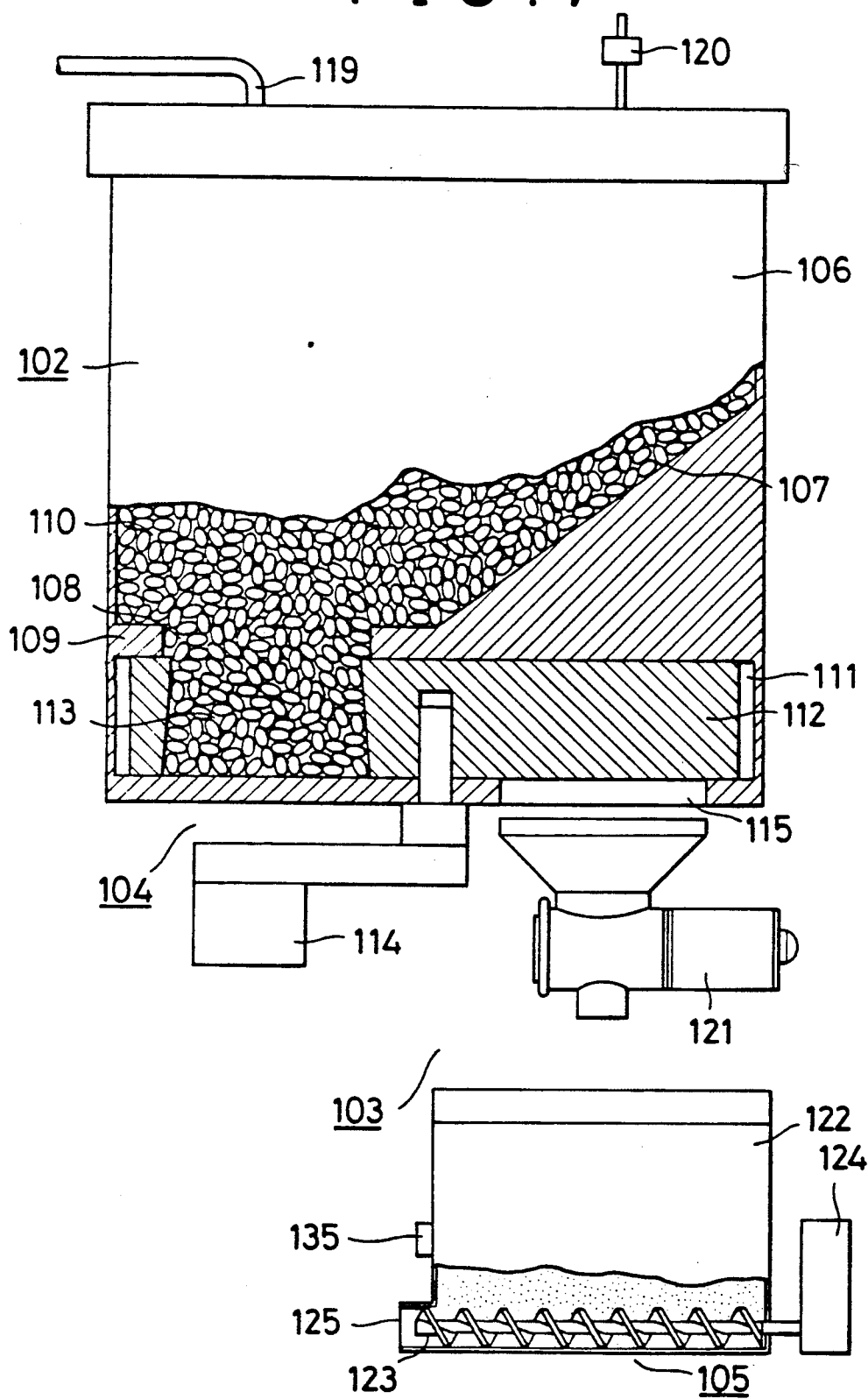
Figure 8:
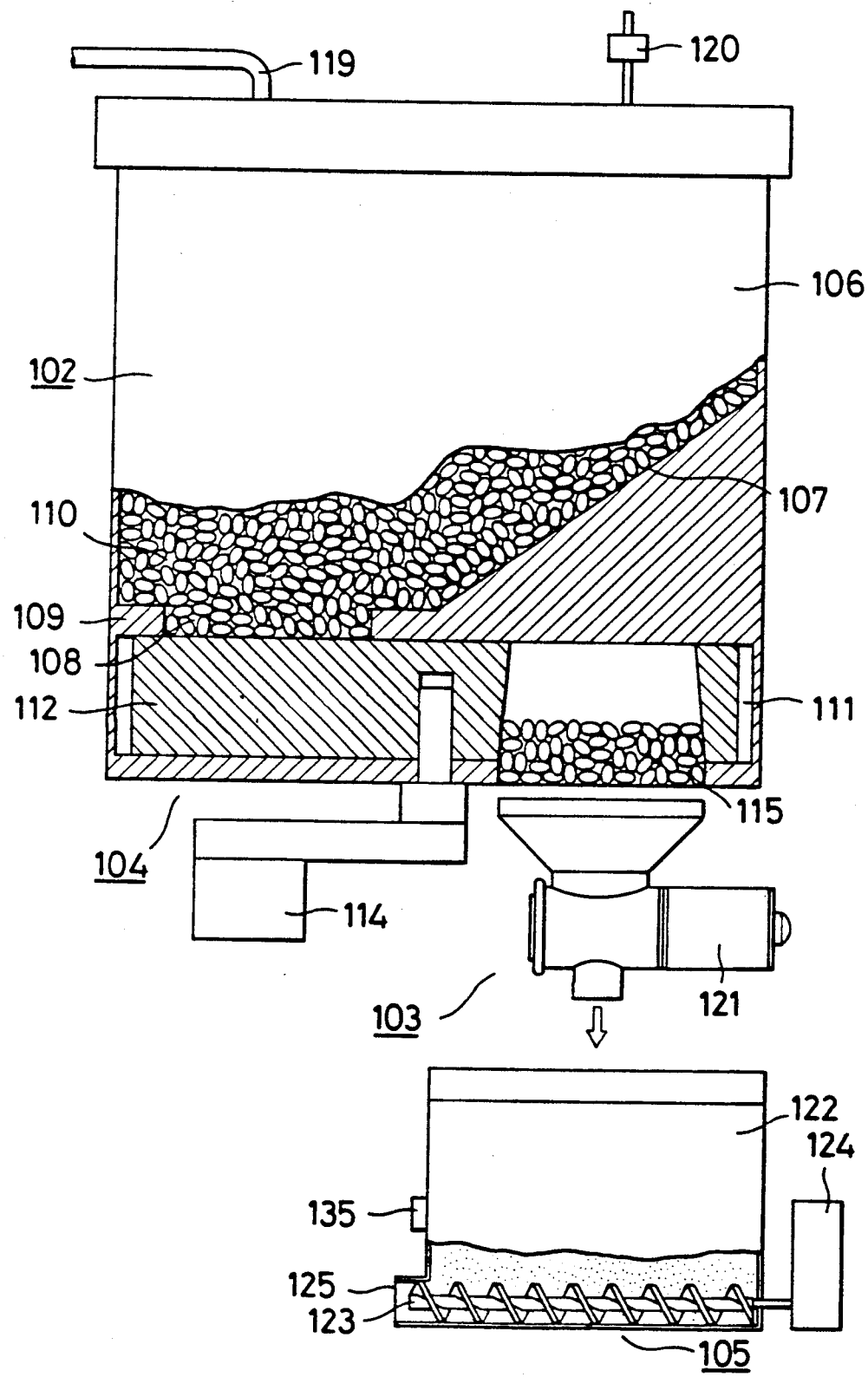

The arrangements of these means are explained below with reference to FIGS. 6 through 8.

The first material storage means 102 is formed integral with the first transport means 104. A coffee bean storage vessel 106 has a partition board 109 which has a sloping wall 107 and an eccentric opening 108, and bisects the inner space thereof into upper and lower portions. The upper portion serves as a coffee beans storage chamber 110, while the lower portion serves as a rotor chamber 111. A rotor 112 is rotatably provided in the rotor chamber 111, and has an eccentric measurement hole 113. The rotor 112 is driven by a motor 114. An outlet 115 is provided at the bottom of the coffee beans storage vessel 106 for delivering the coffee beans in the measurement hole 113 to a mill (described later) in association with the rotation of the rotor 112. A carbon dioxide gas container 116 is connected with the coffee beans storage vessel 106 via an electromagnetic valve 117, a relief valve 118, and a gas tube 119 for controlling the gas flow. A constant pressure valve 120 is connected with the coffee beans storage vessel 106 to relieve excess pressure. The rotor 112 is adapted to make an air-tight seal at its top with the partition board 109 and at its bottom with the bottom of the coffee bean storage vessel 106, so that carbon dioxide gas provided in the coffee beans storage chamber 110 is sealed therein. The coffee bean storage vessel 106, the partition board 109, and the carbon dioxide gas container 116 correspond to the first material storage means first material storage apparatus 102, and the rotor 112, the measurement hole 113, and the outlet 115 correspond to the first transport means 104.

The second material supply apparatus 103 and second transport means 105 are integrally formed. A mill 121 is provided to grind coffee beans supplied from the outlet 115. The ground coffee delivered from the mill 121 is stored non-hermetically in a powder container 122. An auger 123 rotatably mounted at the lower end of the powder container 122 is driven by a motor 124 for transporting the ground coffee out of an exit 125 into the powder container 122. The mill 121 and the powder container 122 correspond to the second material supply apparatus 103, and the auger 123, the motor 124, and the exit 125 correspond to the second transport means 105.

Hot water in a hot water tank 126 is provided to the coffee extraction apparatus 101 via an electromagnetic hot water valve 127 and a hot water tube 128.

The coffee extraction apparatus 101 extracts coffee by pouring hot water from the hot water tube 128 onto ground coffee delivered from the exit 125 of the material supply apparatus 103. The machine further has a sugar supply apparatus 129, a cream supply apparatus 130 and a cup supply apparatus 131 for supplying a cup at a discharge port 141. The machine also has a mixer 132 for mixing a given amount of sugar provided by the sugar supply apparatus 129 and cream provided by the cream supply apparatus 130 into coffee provided by the coffee extraction apparatus 101. Through a tube 133, the coffee mixed by the mixer 132 is provided into the cup 134 provided from the cup supply apparatus 131.

On the side wall of the container 122 is a residual level sensor 135 for detecting the remaining amount of coffee in the container 122. The first material storage apparatus 102 may store 5-6 kg of coffee beans (which amounts to 500-600 cups of coffee) and the second material supply apparatus 103 may store 0.3 kg of ground coffee (which amounts to 30 cups of coffee).

The measurement hole 113 of the rotor 112 may contain coffee beans for 5 cups. Every one rotation of the rotor 112 permits of delivering coffee beans from the first material storage apparatus 102 to the second material supply apparatus 103 via the mill 121, which amounts to 5 cups of coffee. The residual level sensor 135 transmits to a main controller 136 a signal indicating that the remaining amount of coffee in the second material supply apparatus 103 is short for 5 cups.

Figure 9:
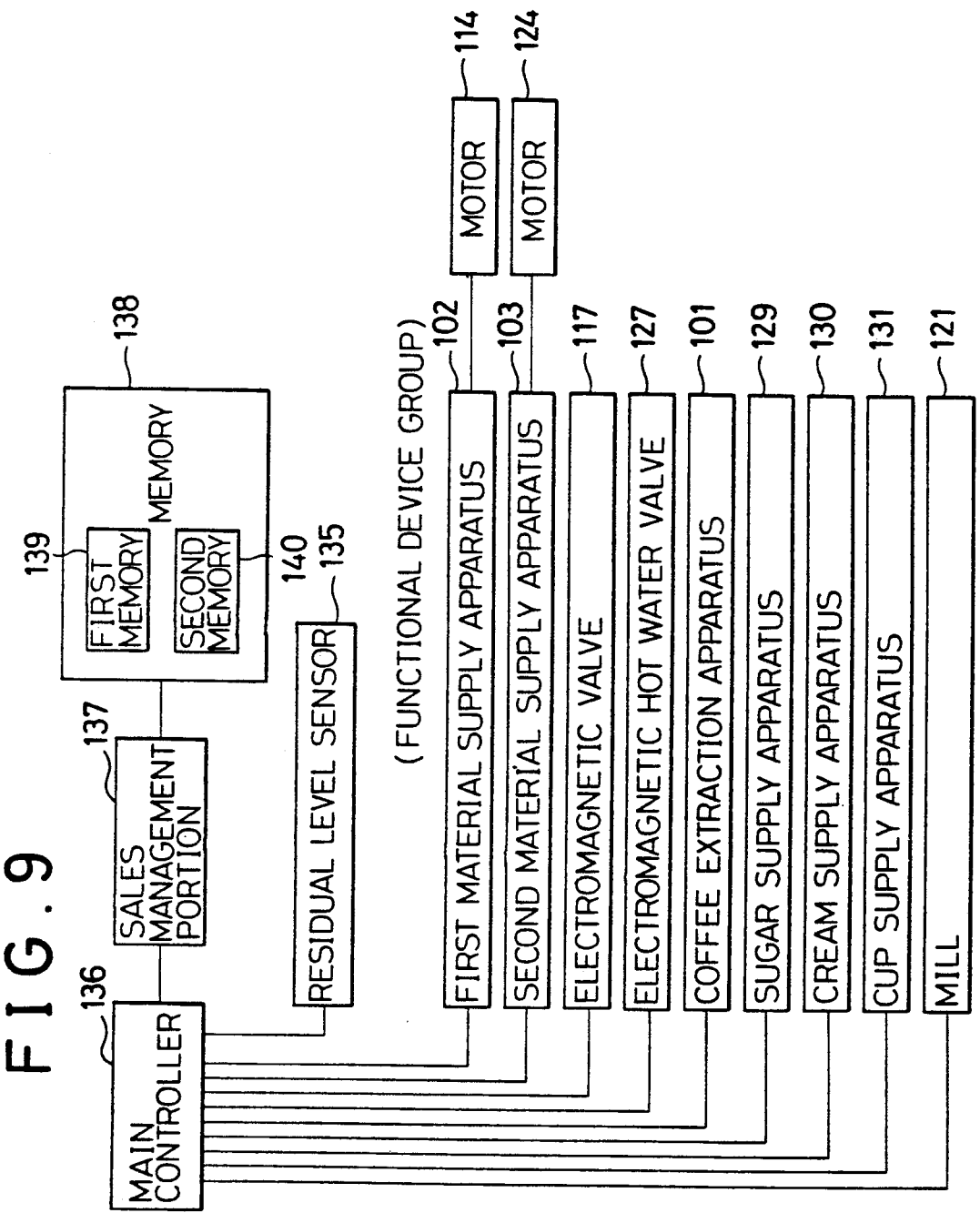

Referring to FIG. 9, there is shown a control system of the automatic vending machine, including a microcomputer 136 serving as a main controller, another microcomputer 137 serving as a sale management unit, and a memory 138 having a first and a second memory portions 139 and 140, respectively.

The elements operate in a manner similar to corresponding ones in the first embodiment and collaborate with the residual level sensor 135 and other elements connected with them. The sale management portion 137 stores a control program, the flow chart of which is shown in FIG. 5. The automatic machine includes a means for making a sales prediction for the near future based on the calendar information and corresponding record of sales stored in the first memory 139, and a means for computing desirable stand-by conditions of the machine, i.e. desirable amounts of coffee materials in the first material storage apparatus 102 and second material supply apparatus 103 in preparation for future sale in accordance with the prediction.

The machine operates as follows. Normally, during a stand-by period the coffee bean storage vessel 106 of the first material storage apparatus 102 is filled with carbon dioxide gas provided from a carbon dioxide gas container 116 via the electromagnetic valves 117, the relief valve 118, and the gas tube 119, so that a large amount of coffee beans may be stored for a long time free of deterioration.

When the machine is to be operated for making coffee, the motor 124 of the second material supply apparatus 103 is activated to drive the auger 123 and an amount of ground coffee needed for one cup of coffee is delivered from the exit 125 to the coffee extraction apparatus 101. At the same time, a cup 134 is provided from the cup supply apparatus 131. Hot water is then provided from the hot water tank 126 via the electromagnetic hot water valve 127 and the hot water tube 128 into the coffee extraction apparatus 101 where coffee is extracted. The extracted coffee is given a predetermined amount of sugar and cream from the sugar supply apparatus 129 and the cream supply apparatus 130, respectively, and mixed by the mixer 132. The coffee is then poured from the tube 133 into the cup 134 for the customer.

February 10, O o'clock, the first material storage apparatus 102 is almost full with coffee beans and there is ground coffee remaining in the second material supply apparatus 103 for 10 cups. At this time, then, the sales manager 43 makes sale prediction for the next two days, obtaining a result as shown in FIG. 11.

However, since no sale is predicted until 6 o'clock, the automatic vending machine awaits customers in a stand-by condition. It is expected during a period from 6 to 8 o'clock that there will be some customers. If a customer appears at, say 6:10, to order a cup of coffee, the automatic vending machine makes a cup of coffee as mentioned above. The amount of coffee remaining in the second material supply apparatus 103 is now for 9 cups.

After similar sale of 4 more cups of coffee, the remaining coffee in the second material supply apparatus 103 reduces to the amount for 5 cups. Then the residual level sensor 135 operates, notifying the main controller 136 of the remaining amount of coffee. Based on the information the main controller 136 and the sale management unit 137 decides on grinding more coffee and storing it in the second material supply apparatus 103 in preparation of subsequent sale, and activate the motor 114 of the first transport means 104, causing the rotor 112 to transport replenishing coffee beans from the first material storage apparatus 102 to the mill 121, where the coffee is ground. The ground coffee is transferred to the second material supply apparatus 103 and stored there. Since a relatively large amount of coffee is expected to be sold from 06:00 to 20:00 o'clock, the sale management portion 137 decides to store maximum amount of ground coffee in the second material supply apparatus 103 by operating 5 times the rotor 112 to grind coffee for 25 more cups.

When no further sale is expected, for example at time 20:00 of February 10, with coffee remaining for 5 cups in the second material supply apparatus 103, the main controller 136 and the sale management portion 137 make a decision, based on the prediction, that the machine should either remain in a stand-by condition and leave the second material supply apparatus 103 not supplied with further coffee so that deterioration of coffee in the second material supply apparatus 103 is minimized, or should supply a minimum amount of coffee (e.g. enough for 5 cups), and proceed to so control the machine.

In this arrangement, since the first material storage apparatus 102 allows long term storage of coffee beans in an air-tight sealed condition, it is possible to preserve a large amount of coffee beans in favorable condition, eliminating tedious replenishment labour. In addition, since the coffee stored in the second material supply apparatus 103 has been ground already by the mill 121, upon request of customers, a great amount of coffee may be extracted by the coffee extraction apparatus 101 quickly without tedious procedures.

The machine may provide coffee much quicker than conventional ones which grind coffee beans when extracting coffee.

It should be appreciated that based on sale data of coffee desirable conditions of the machine for future sale are estimated and accordingly an adequate amount of material may be stored in the second material supply apparatus 103 in a favorable condition by controlling the transportation of the material delivered from the first material storage apparatus 102.

Since in the second example discussed above material is stored in a non-sealed condition in the second material supply apparatus 103, it is easier to maintain the sealed condition of the first material storage apparatus 102 storing a large amount of food, compared to a case in which material is directly furnished from the first material storage apparatus 102, thereby simplifying the structure of the first material storage apparatus 102.

Figure 12:
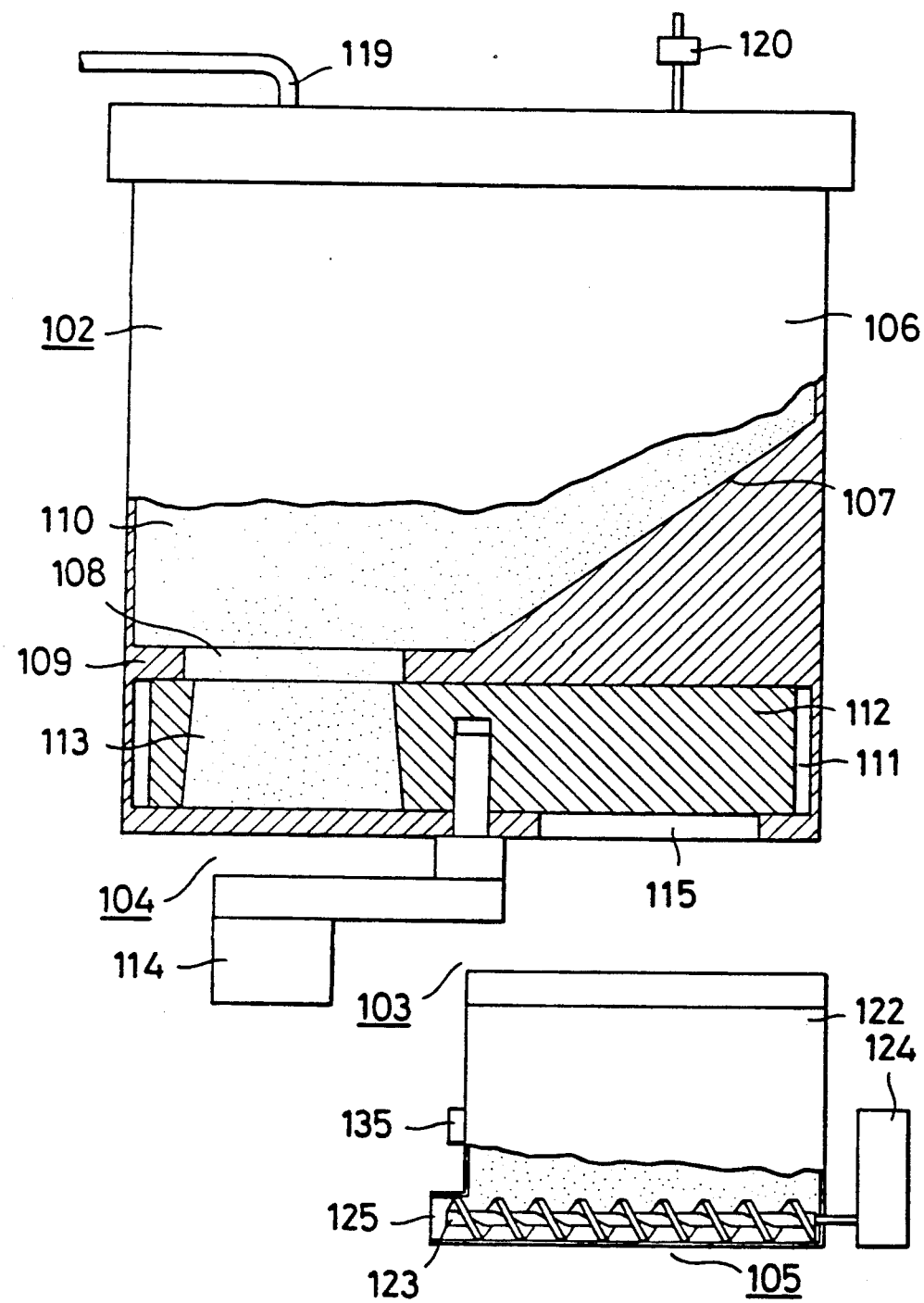
FIG. 12 is a cross section of a third automatic food vending machine embodying the invention.
Figure 13:
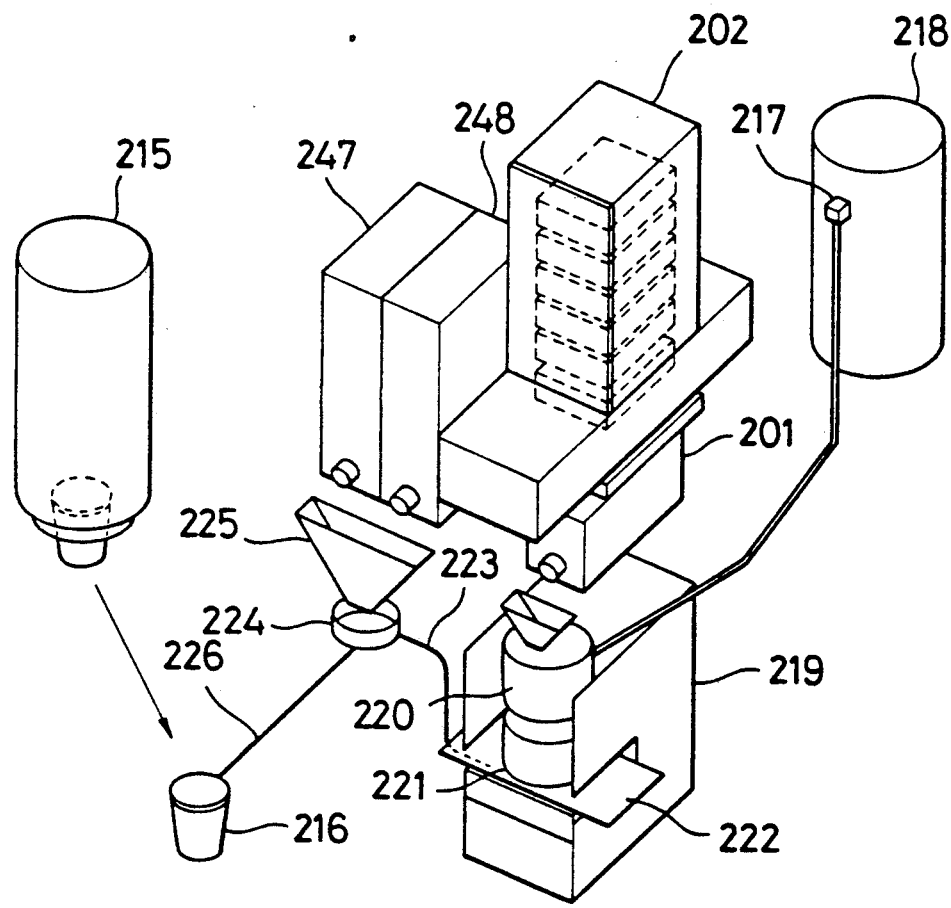
Figure 14:
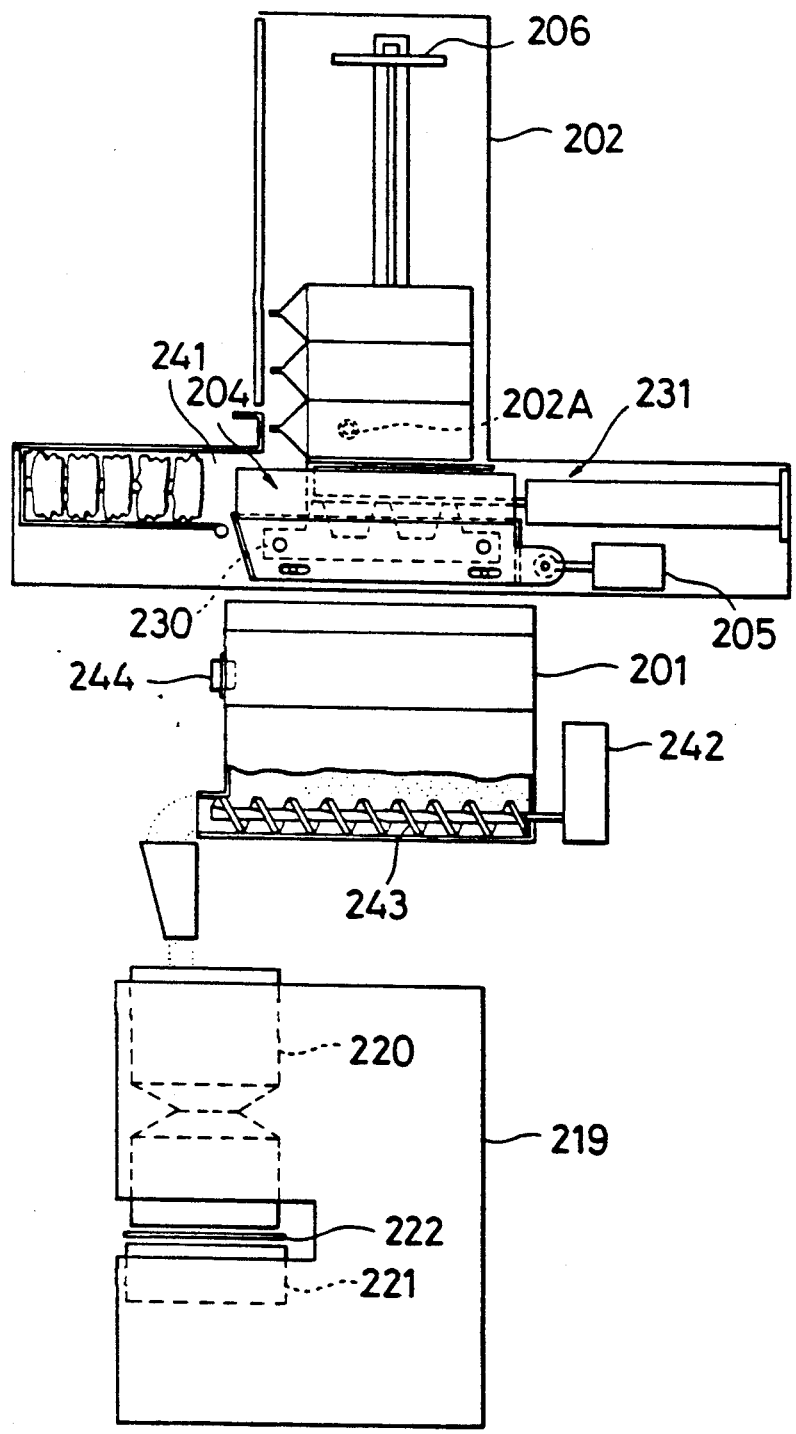
Figure 15:
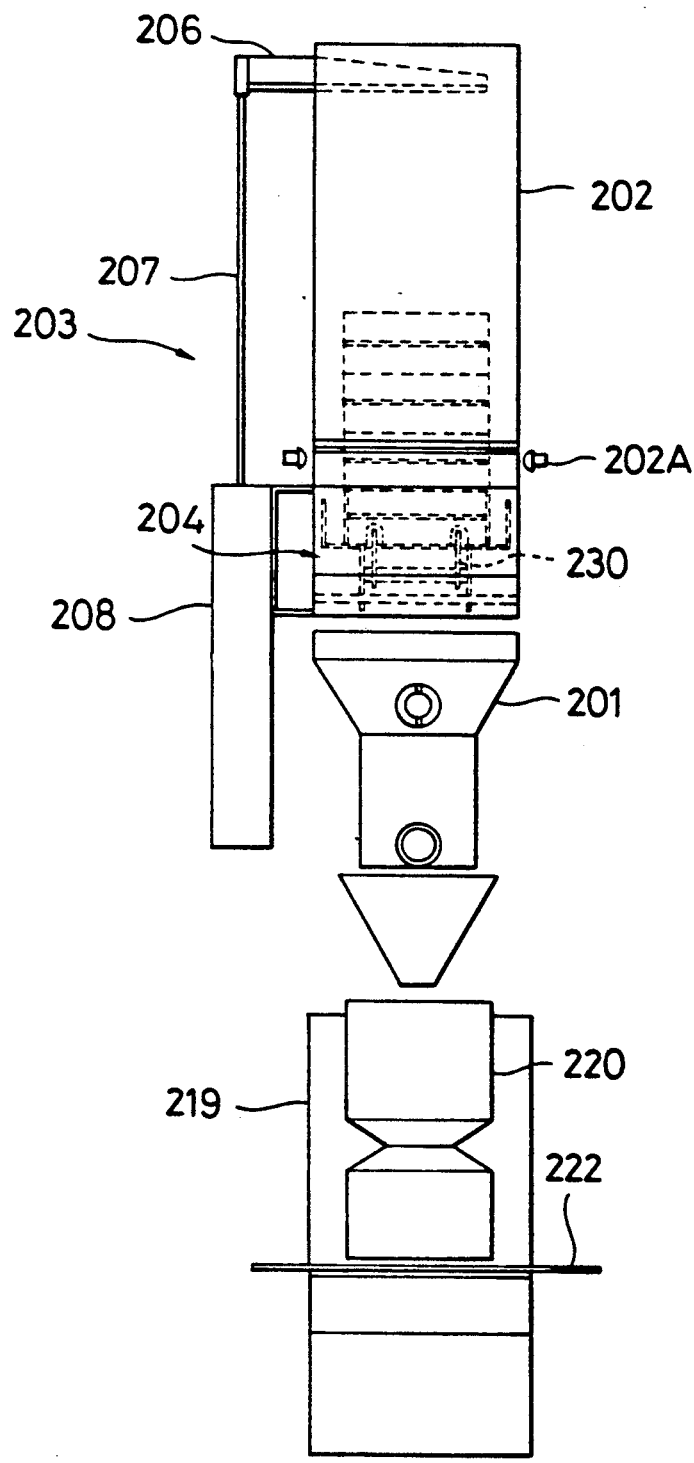
Figure 16:
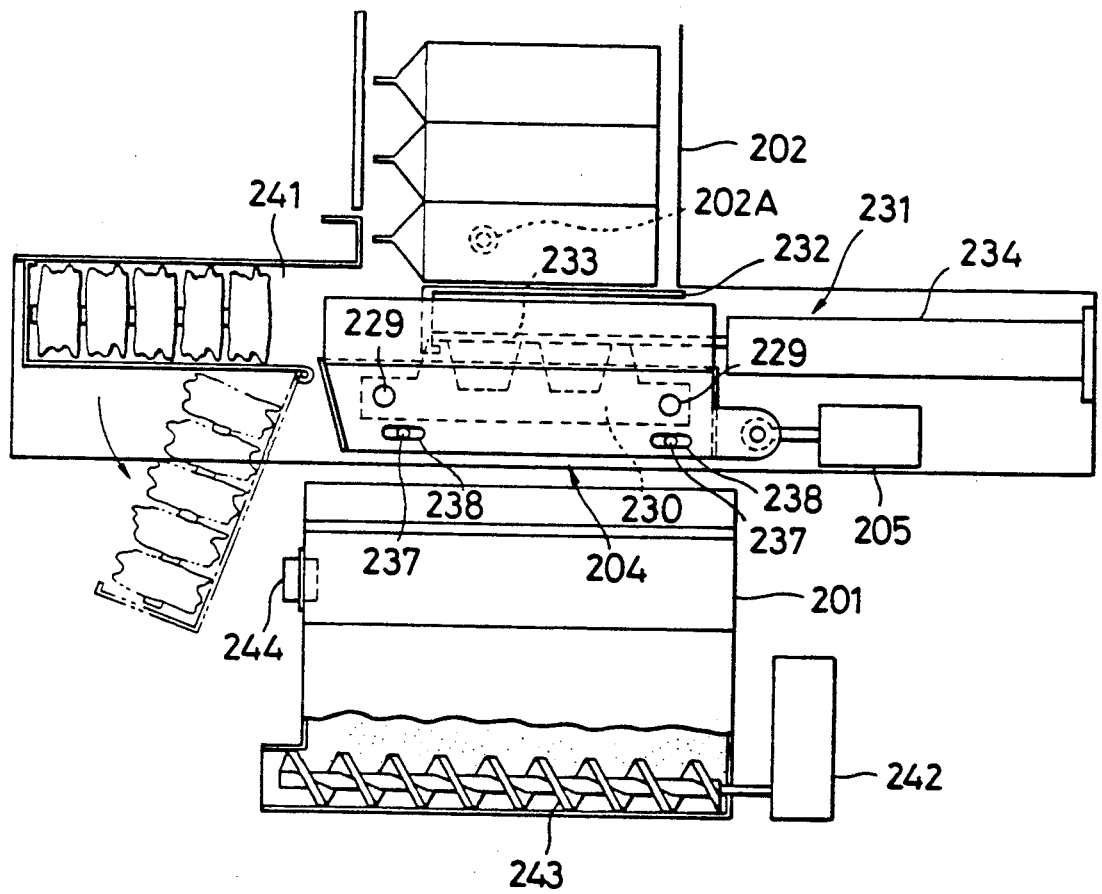

A third alternative mode of the invention is shown in FIG. 12, in which the first material storage apparatus 102 may also store the ground coffee therein, so that the mill 121 of the second example in not required. In this example the time required for making coffee is naturally shorter than the case of making coffee from coffee beans. This time is the same as in the case of making coffee from ground coffee stored in a separate container other than the sealed first material storage apparatus 102 and furnished to the coffee extraction apparatus 101 every time it is needed. However, the first material storage apparatus 102 may be also simplified in structure as in the preceding examples, since it is easy to maintain the first material storage apparatus 102 hermetic.

A fourth example in still another form of automatic coffee vending machine is now described with reference to FIGS. 13 through 25.

This automatic vending machine is capable of furnishing a cup 216 from a cup supply apparatus 215 upon reception of a proper signal, furnishing an amount of ground coffee needed for one cup of coffee from a tank 201 serving as the second coffee storage means, and opening an electromagnetic valve 217 to furnish the necessary amount of hot water from a hot water tank 218 to a food cooking apparatus serving as a coffee extraction apparatus 219. This arrangement is designed for making regular coffee.

The coffee extraction apparatus 219 includes a funnel 220 for mixing the ground coffee and the hot water therein and a drink receiving portion 221, which may be separated when a paper filter 222 is to be inserted horizontally in between them. The coffee material and the hot water inside the funnel 220 is pressurized during extracting coffee. The extracted coffee is filtered by the paper filter 222, leaving residue on the paper filter 222 and introduced to the drink receiving portion 221. The drink receiving portion 221 is connected at its outlet with a tube 223. The extracted coffee is introduced to a mixing apparatus 224 by the tube 223. When the extraction of coffee is completed in the coffee extraction apparatus 219, the funnel 220 and the drink receiving portion 221 are separated to remove the paper filter 222 in a horizontal direction, supplied with a new paper filter 222, and coupled again for the next extraction operation.

The mixing apparatus 224 containing the extracted coffee is supplied with a given amount of cream and sugar from material suppliers 247 and 248, respectively, via a chute 225, as required. The coffee mixed with the cream and sugar in the mixing apparatus 224 is poured into the cup 216 through a tube 226.

As explained above the invention is characterized in that ordinary packed materials that are on market may be utilized in the tank 201, and only necessary amount of packs may be opened on demand. These packs may be stacked in a pack storage apparatus 202 serving as the first food storage means, which packs may be taken out one at a time by a pack extraction apparatus 203 serving as the first transport means and opened by an pack opener 204 as the remaining material in the tank 201 decreased below a predetermined level. The cut pack is vibrated by a vibrator 205 in refilling the tank 201. Referring to FIGS. 14 through 22, further details of the relevant elements pertinent to the pack storage apparatus 202 are explained below.

The pack storage apparatus 202 has a pack sensor 202A for detecting a pack. The pack extraction apparatus 203 may operate provided that the pack sensor 202A detects a pack. The pack extraction apparatus 203 includes a pressure board 206 for pushing from above the packs in the pack storage apparatus 202 and a pressurizing cylinder 208 for providing pressure to the pressure board 206 via a pressuring rod 207. The pressurizing cylinder 208 contains two air passages 208A and 208B opposing with each other across the piston (FIG. 23), which air passages are provided with electromagnetic three-way valves 210 and 211, respectively. The remaining two ports of these three-way valves 210 and 211 are connected with an air compressor 212 and an air relief duct 213 so that, by switching the electromagnetic valve 210 to communicate the air compressor 212 with the 202A and the electromagnetic valve 211 to communicate the air relief duct 213 with the air passage 208B, the pressuring rod 207 may be forced out of the pressurizing cylinder 208, and that by switching the electromagnetic valve 211 to communicate the air compressor 212 with the air passage 208B and by switching the electromagnetic valve 210 to communicate the air relief duct 213 with the air passage 208B, the pressuring rod 207 may be retracted into the pressurizing cylinder 208. On the pressurizing cylinder 208 is provided a sensor 209 (FIG. 23) for detecting the position of the piston, providing a signal indicative of the displacement of the piston to thereby regulate the amount of the air supplied from the air compressor 212 through the electromagnetic valves 210 and 211.

The pack opener 204 includes a pack support 227 for supporting the lowest pack in the pack storage apparatus 202, a pair of protruding edges 230 provided at the opening 228 formed in the pack support 227, and a pusher apparatus 231 for pushing the lowest pack sideward. The protruding edges 230 are mounted on rods 229 which extend on the opposite sides of the opening 228 of the pack support 227. The protruding edges 230 have teeth extending upward. As the pressure board 206 pushes the packs in the pack storage apparatus 202, the teeth of the protruding edges 230 engage the lower surface of the lowest pack.

The push apparatus 231 has a push board 232 and a push cylinder 234 for giving the push board 232 a push via a push rod 233. The push cylinder 234 has therein two opposing air passages 234A and 234B across the piston in the cylinder 234. The two air passages 234A and 234B are connected with electromagnetic three-way valves 235 and 236, respectively. The remaining two ports of respective valves are connected with the air compressor 212 and air relief duct 213, respectively. Thus, by switching the electromagnetic valve 235 to communicate the air compressor 212 with the air passage 234A and at the same time switching the electromagnetic valve 236 to communicate the air relief duct 213 with the air passage 234B, the push rod 233 is extended forwardly from the push cylinder 234. By switching the electromagnetic valve 236 to communicate the air compressor 212 with the air passage 234B and at the same time switching the electromagnetic valve 235 to communicate the air relief duct 213 with the air passage 234A, the push rod 233 is retracted backward into the push cylinder 234. Similar to the pressurizing cylinder 208, the push cylinder 234 is provided with a sensor 245 (FIG. 23) for detecting the position of the piston. In accordance with the displacement of the push board 232 as indicated by the signal provided by the sensor 245, the electromagnetic valves 235 and 236 are controlled to regulate the flow of pressurized air from the air compressor 212 and passing through them.

The horizontal push of the pack by the push apparatus 231 causes the teeth of the protruding edge 230 sticking in the pack cut the pack to, allowing the content thereof to fall downward into the opening 228 of the pack support 227. The tank 201 having its intake port facing the opening 228 is then supplied with the content.

Figure 22:
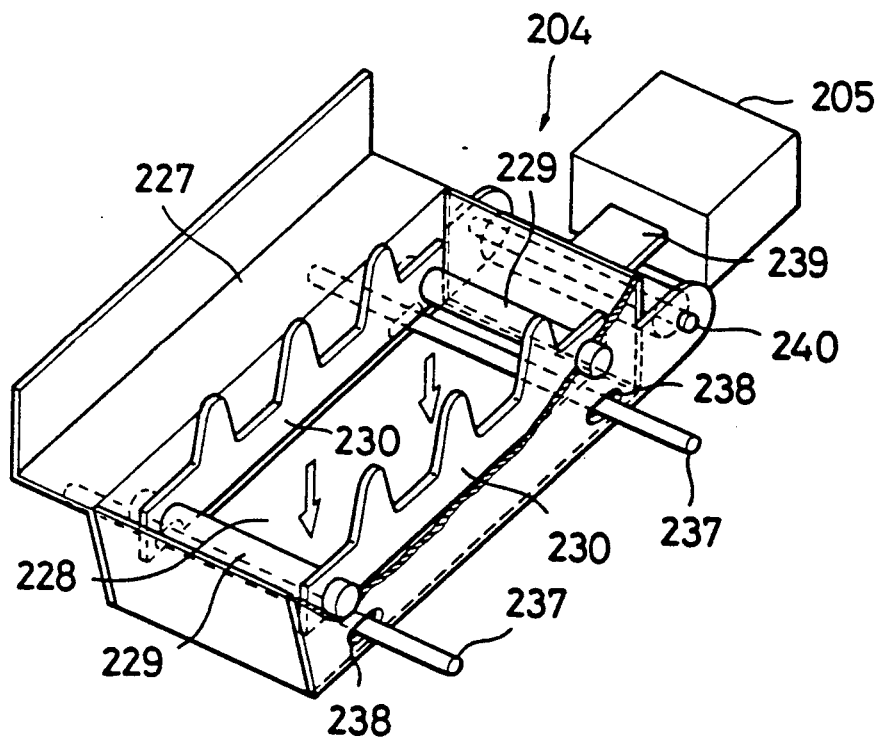
Figure 23:
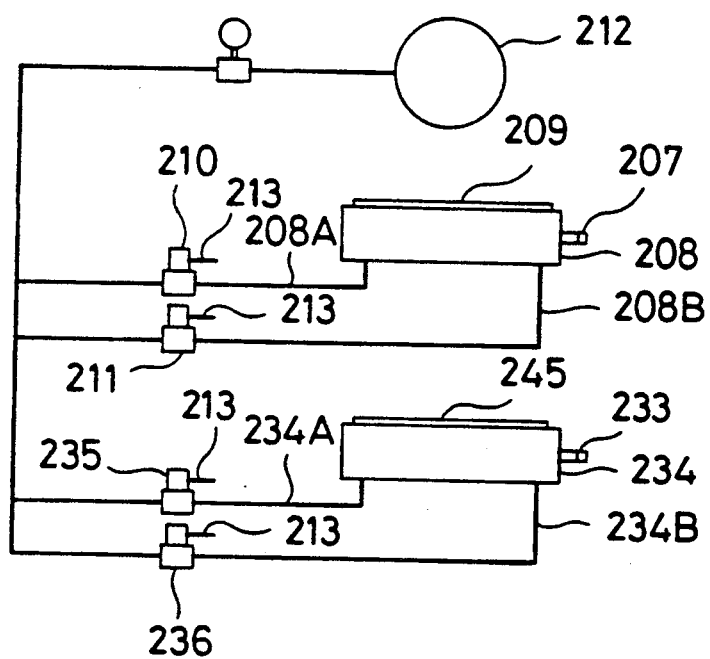
Figure 24:
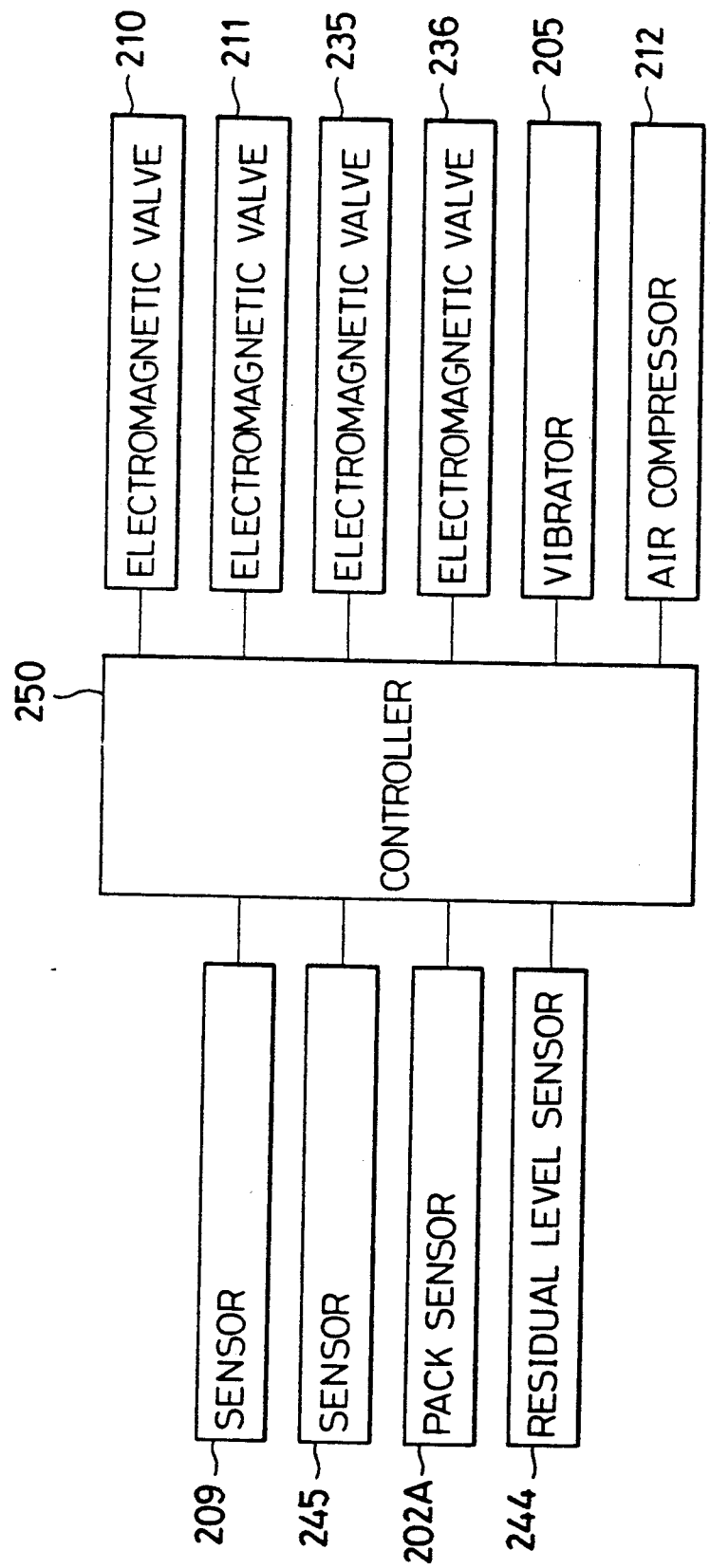

The pack support 227 is supported at their opposite ends by rods 237 (FIG. 16) which passes through elongated bores 238 provided in the pack support 227 and fixed on a frame (not shown) of the machine. Consequently, as the electromagnetically activated vibrator 205 vibrates, the pack support 227 is swung to and for, shaking the pack held thereon. The vibrator 205 may be an electromagnetically operable vibrator driven by an AC power. The vibration member 239 is connected with the end of the pack support 227 by means of pins 240 (FIG. 22).

Figure 21:
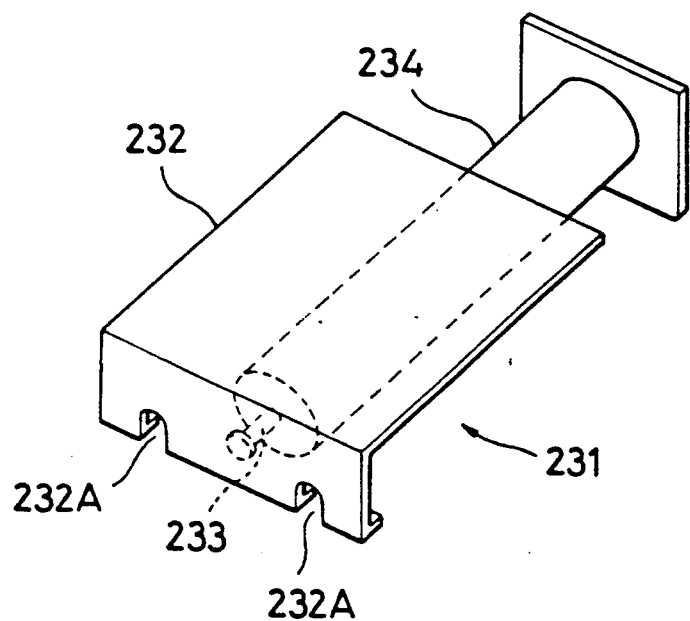

The push apparatus 231 of the pack opener 204 also pushes the unpacked pack horizontally into an empty pack receiving portion 241 after it is cut by the teeth of the protruding edges 230 and the content is introduced into the tank 201. The empty pack receiving portion 241 is arranged at a position suitable for receiving the unpacked packs pushed by the push board 232. The bottom of the empty pack receiving portion 241 may be opened for removing the packs. When the push board 232 pushes the unpacked packs, it must reach the empty pack receiving portion 241 past the protruding edges 230, so that the protruding edges 230 has cut portions 232A for avoiding collision with the teeth of the protruding edges 230 (FIG. 21).

The tank 201 is designed to provide a predetermined amount of its content to the coffee extraction apparatus 219 by means of a rotating auger 243 serving as the second transport means. As the remaining content reduces to a predetermined level, a residual level sensor 244 for detecting the amount of the material in the tank transmits signals indicative of the amount of the content when the level of the material is lower than the height of the sensor. This residual level sensor 244 may be either a proximaty sensor or a photosensor. A controller 250 (FIG. 24) is connected with the electromagnetic valves 210, 211, 235, and 236, the sensors 209 and 245, the air compressor 212, the vibrator 205, the pack sensor 202A, and the residual level sensor 244, and in response to the detection signals from these sensors controls the operations of the electromagnetic valves 210, 211, 235, and 236, the air compressor 212, and the vibrator 205, thereby controlling the replenishment operation of material to the tank 201.

Figure 25:
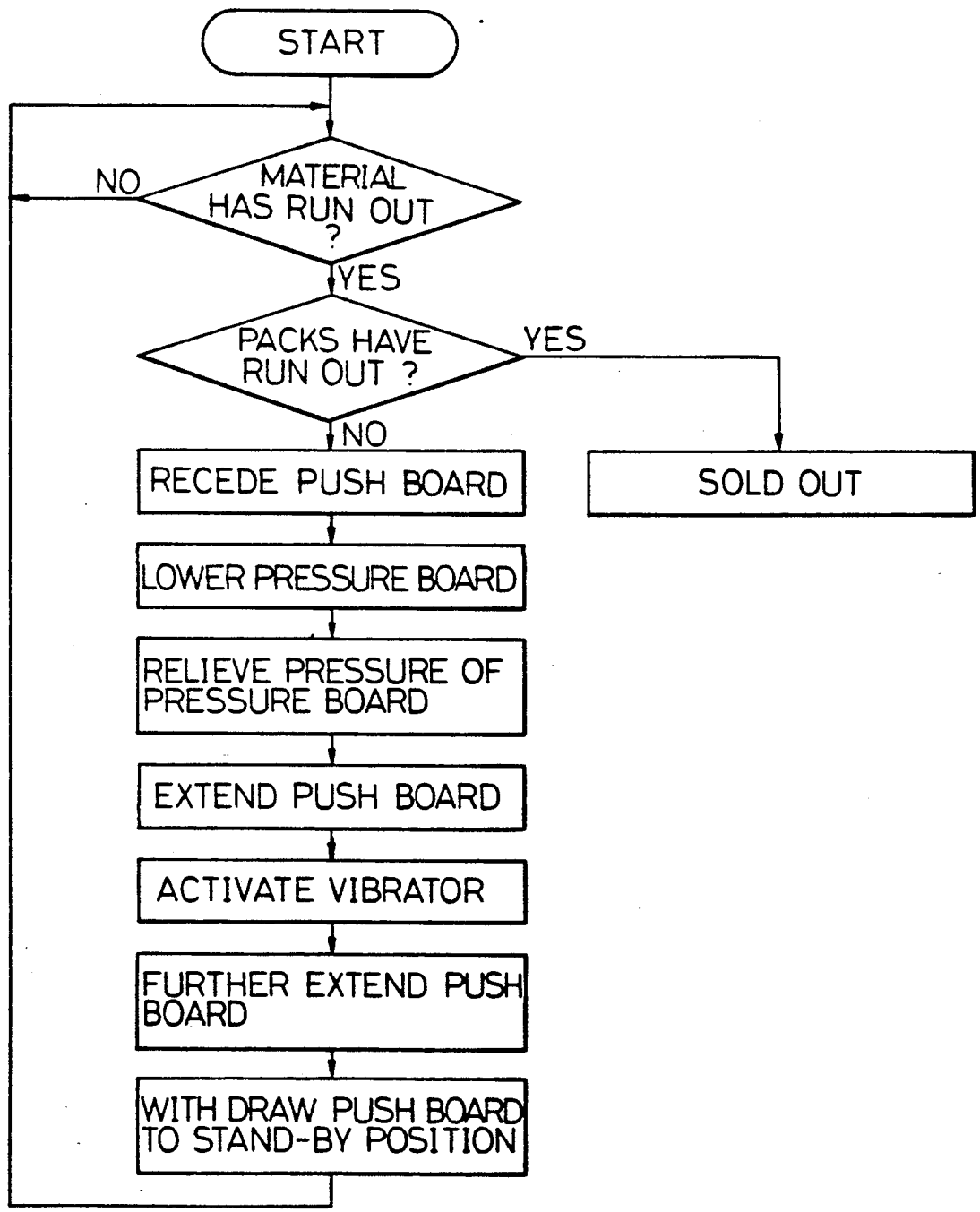

These operations proceed as shown in the flow chart of FIG. 25. Under stand-by conditions (FIG. 16), the push board 232 is located directly beneath the pack storage apparatus 202 and supporting on the upper surface thereof a stack of packs. When the residual level sensor 244 transmits a signal indicative of the running out of the stock of food material, the controller 250 judges from the signal received from the 202A if there is any pack remaining in the pack storage apparatus 202. And, if not, the controller 250 makes a decision that the food is sold out and terminates the operations of the automatic vending machine.

If, on the other hand a pack is remaining, the controller 250 causes the push board 232 to retract and extracts the pack from the pack storage apparatus 202. In order to make the push board 232 retract the controller 250 activates the air compressor 212 and controls the operation of the electromagnetic valves 235 and 236 such that the air passage 234B and the air compressor 212 communicate and the air relief duct 213 and the air passage 234A communicate.

Figure 17:
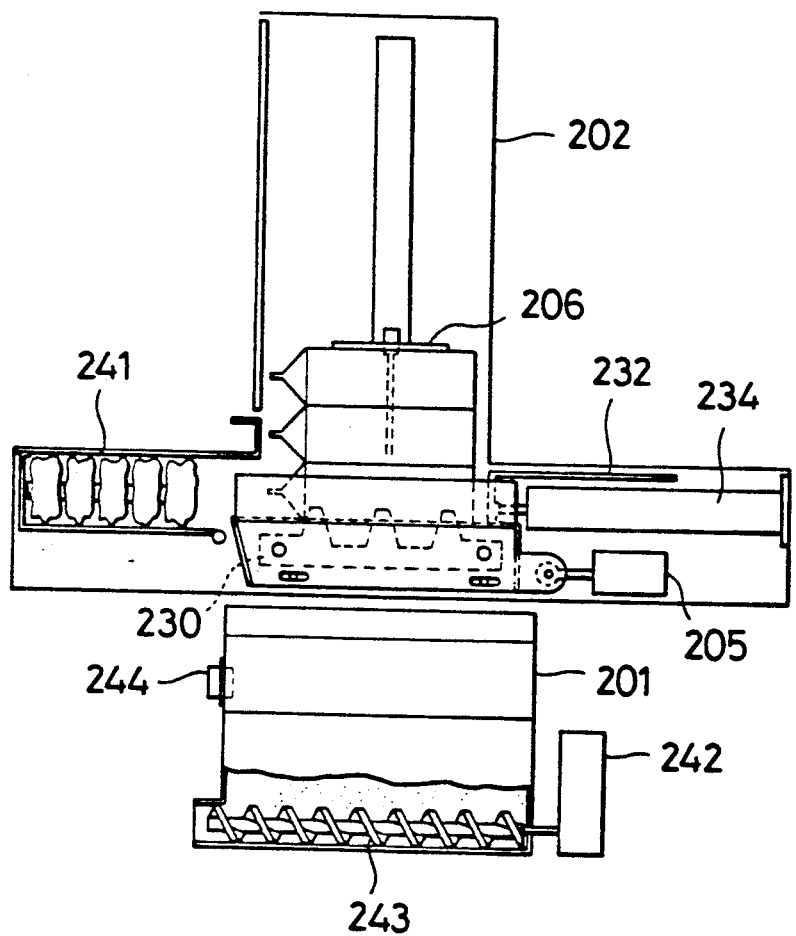
Figure 18:
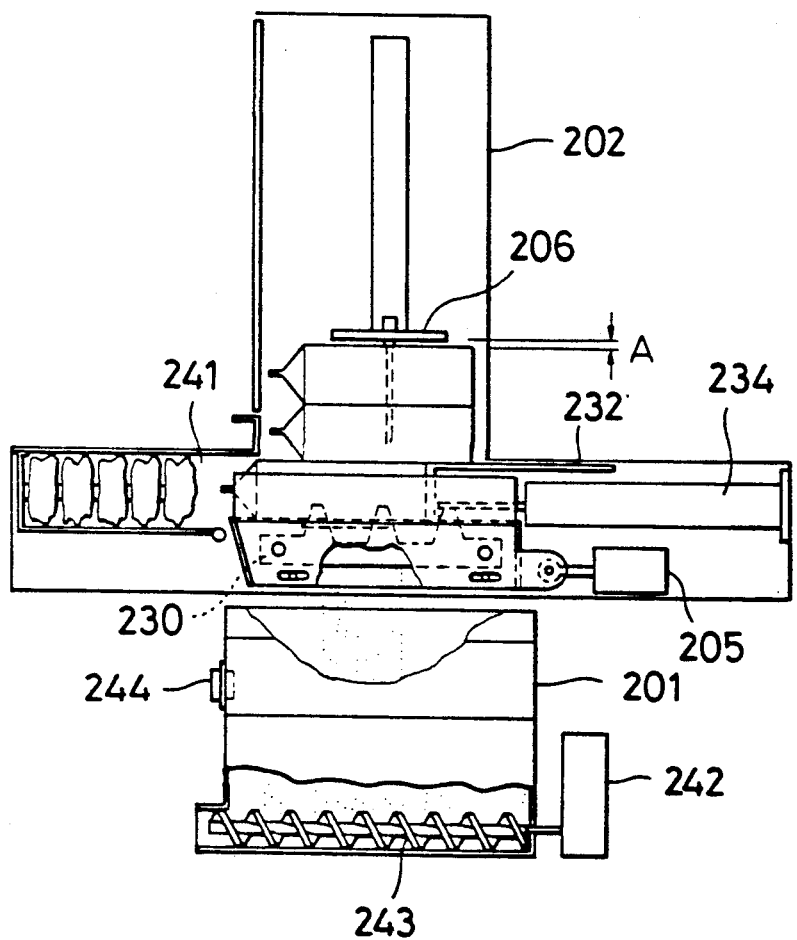
Figure 19:
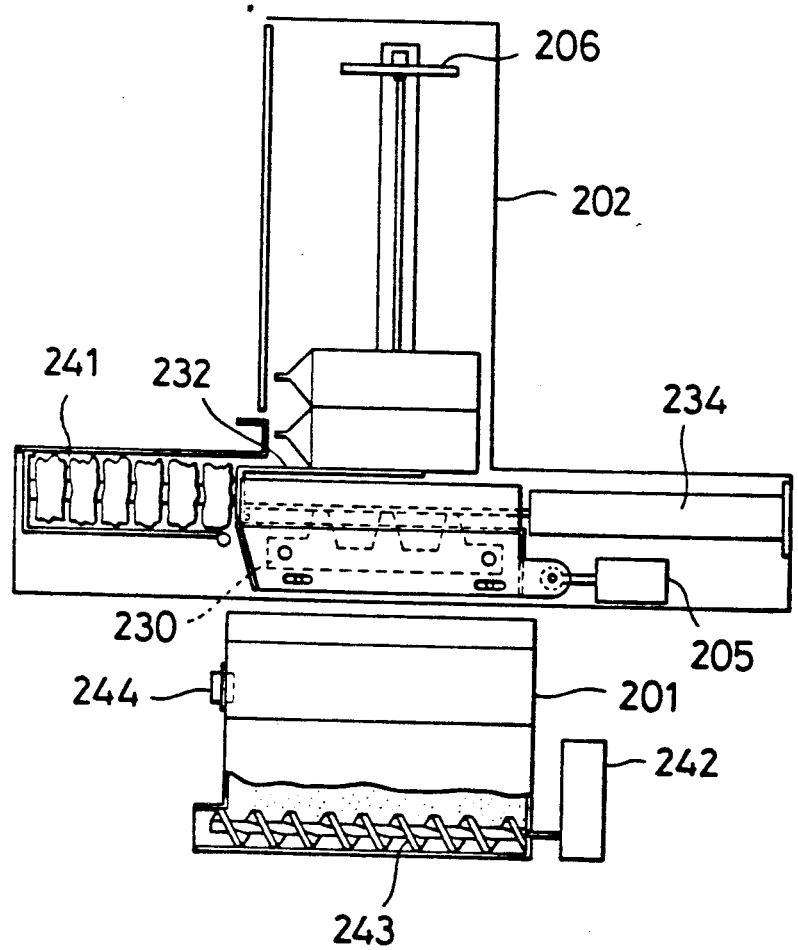
Figure 20:
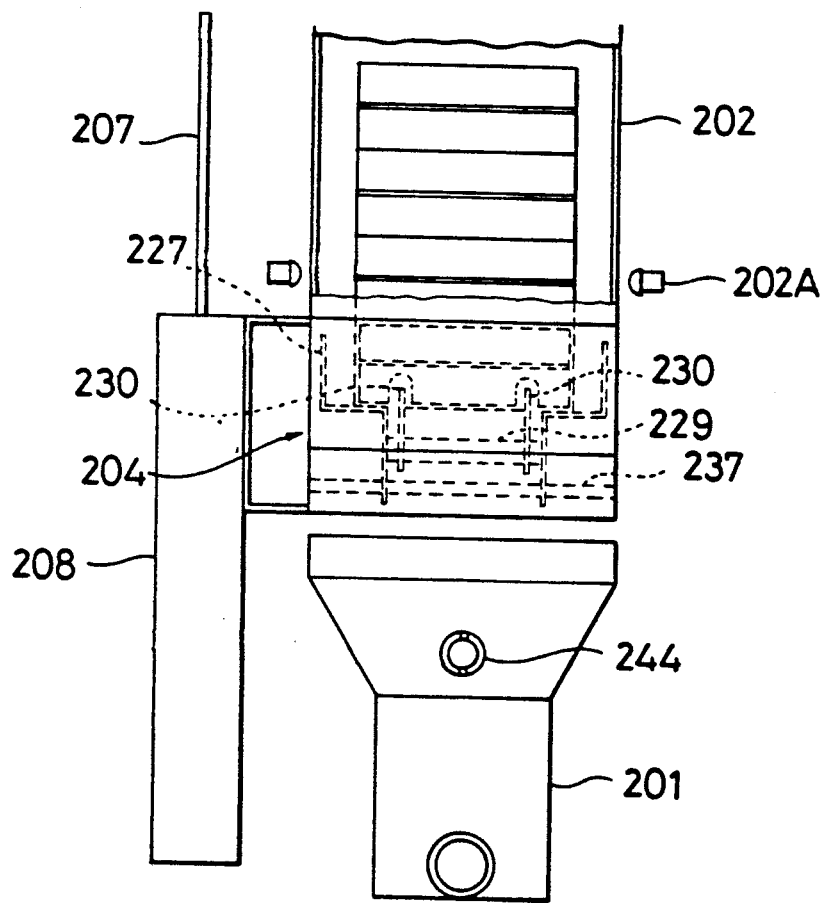

Following the recession of the push board 232, a stack of the packs in the pack storage apparatus 202 is lowered so that the lowest pack is positioned on the pack support 227. The controller 250 activates the air compressor 212 to lower the pressure board 206 and operates the electromagnetic valves 210 and 211 so as to communicate the air compressor 212 with the air passage 208B and the air relief duct 213 with the air passage 208A. As the pressure board 206 is lowered the teeth of the protruding edges 230 pierce the lower surface of the lowest pack. When the pressure board 206 is lowered to a predetermined level, as sensed by the sensor 209, the controller 250 stops the lowering motion of the pressure board 206 (FIG. 17). The controller 250 then activates the air compressor 212 and operates the electromagnetic valves 210 and 211 so as to communicate the air compressor 212 with the air passage 208A and the air relief duct 213 with the air passage 208B, to thereby lift the tube 226 by a small amount A (FIG. 18) just enough to slightly relax the pressure acting on the pack.

The controller 250 then drives the air compressor 212 and operates the electromagnetic valves 235 and 236 so as to communicate the air compressor 212 with the air passage 234A and the air relief duct 213 with the air passage 234B, thereby pushing the push board 232 towards the pack storage apparatus 202. This operation causes the push board 232 to horizontally push the lowest pack which is held in position on the upper surface of the push board 232, with the teeth piercing into the pack, said teeth thereby cutting the pack. The controller 250 once stops the operation of the push board 232 as it receives the signal from the sensor 245 that the push board 232 has extended sufficiently for tearing the pack by the teeth. The material dropped from the torn pack will be introduced through a material intake port into the tank 201. The controller 250 then outputs a signal to the vibrator 205. This causes the vibrator 205, and hence the pack, to vibrate, so that the content of the pack may be removed quickly and effectively into the tank 201.

After a predetermined duration of the vibration of the vibrator 205, the controller 250 again activates the push board 232 to extend to the pack receiving portion 241 (FIG. 19), thereby pushing the empty pack in the empty pack receiving portion 241. The controller 250 then lets the push board 232 withdraw to the original stand-by position. This completes the replenishment operation for feeding the material in the tank 201.

I claim:

1. An automatic food vending machine comprising:
    means for cooking food materials;
    first storage means for storing food materials for a long period;

second storage means for preserving food materials in a condition that they can be quickly cooked by said cooking means;

first transport means for transporting food materials from said first storage means to said second storage means;

second transport means for transporting food materials from said second storage means to said cooking means;

memory means for storing information concerning the food materials that were sold from said machine over a predetermined period;

means for computing desirable storage conditions of food materials in the second storage means based on the information stored in the memory means; and means for controlling the operation of the first transport means based on the computed storage conditions.

2. An automatic food vending machine comprising:
means for cooking food materials;
first storage means for hermetically preserving food materials;
second storage means for non-hermetically preserving food materials;
first transport means for transporting food materials from said first storage means to said second storage means;
second transport means for transporting food materials from said second storage means to said cooking means; and
memory means for storing information concerning the food materials sold from the machine over a predetermined period;
means for computing desirable storage conditions of food materials in the second storage means based on the information stored in the memory means; and
means for controlling the operation of the first transport means based on the computed storage conditions.

3. An automatic food vending machine as in claim 2, wherein
said first storage means stores powdered food materials packed in sealed packs, and further comprising:
a cutting means between said first storage means and said second storage means for cutting packs taken out from the first storage means by said first transport means.

4. An automatic food vending machine as recited in claim 3, further comprising a vibration means for vibrating the pack containing the powdered food material.

5. An automatic food vending machine comprising:
means for cooking food materials;
first storage means for hermetically storing produced preserving food materials;
second storage means for non-hermetically preserving food materials in sealed packs;
first transport means for transporting the packs from said first storage means to said second storage means;
second transport means for transporting the packs from said second storage means to said cooking means; and
cutting means between said first storage means and said second storage means, for cutting packs taken out from the first storage means by said first transport means.

6. An automatic food vending machine as recited in claim 5, further comprising a vibration means for vibrating the pack containing the powdered food material.

* * * * *